US012624715B2

(12) United States Patent
    Kubacki

(10) Patent No.: US 12,624,715 B2
(45) Date of Patent:       May 12, 2026

(54) COUPLING SYSTEMS AND METHODS

(71) Applicant: Wright Medical Technology, Inc., Memphis, TN (US)

(72) Inventor: Meghan R. Kubacki, Cookeville, TN (US)

(73) Assignee: WRIGHT MEDICAL TECHNOLOGY, INC., Memphis, TN (US)

( * ) Notice:    Subject to any disclaimer, the term of this patent is extended or adjusted under 35 U.S.C. 154(b) by 1132 days.

(21) Appl. No.: 17/650,116

(22) Filed: Feb. 7, 2022

(65) Prior Publication Data

US 2022/0316504 A1     Oct. 6, 2022

Related U.S. Application Data

(60) Provisional application No. 63/169,306, filed on Apr. 1, 2021.

(51) Int. Cl.
    *F16B 2/02*        (2006.01)

(52) U.S. Cl.
    CPC ...................................... *F16B 2/02* (2013.01)

(58) Field of Classification Search
    CPC .... F16B 7/10; F16B 7/105; F16B 7/14; F16B 7/1454
    See application file for complete search history.

(56) References Cited

U.S. PATENT DOCUMENTS

| | | |
|---|---|---|
| 1,090,881 A | 3/1914 | Rowley |
| 3,872,519 A | 3/1975 | Giannestras et al. |

| | | |
|---|---|---|
| 3,889,300 A | 6/1975 | Smith |
| 3,896,502 A | 7/1975 | Lennox |
| 3,896,503 A | 7/1975 | Freeman et al. |
| 3,975,778 A | 8/1976 | Newton, III |

(Continued)

FOREIGN PATENT DOCUMENTS

| | | |
|---|---|---|
| FR | 2220235 A1 | 4/1974 |
| RU | 2062072 C1 | 6/1996 |

(Continued)

OTHER PUBLICATIONS

Extended European Search Report issued in connection with corresponding Patent Application No. 22163283.9, Aug. 8, 2022, 11 pages.

(Continued)

*Primary Examiner* — Daniel J Wiley

(74) *Attorney, Agent, or Firm* — DUANE MORRIS LLP

(57)        ABSTRACT

Various systems and methods are disclosed for joining multiple components of a prosthesis. For example, a system includes a first component having a body extending from a first end to a second end. Each of the first and second ends including a coupling element. At least one end including a male coupling element including a detent disposed within a hole defined by a protrusion, the detent being biased by a biasing member. A method includes coupling a first component to a second component. Coupling the first component to the second component includes aligning a female engagement element provided by the first component with a male coupling component provided by the second component and inserting the male coupling element into the female coupling element.

25 Claims, 20 Drawing Sheets

(56) References Cited

U.S. PATENT DOCUMENTS

| | | | |
|---|---|---|---|
| 3,987,500 | A | 10/1976 | Schlein |
| 4,156,944 | A | 6/1979 | Schreiber et al. |
| 4,166,292 | A | 9/1979 | Bokros et al. |
| 4,229,839 | A | 10/1980 | Schwemmer |
| 4,232,404 | A | 11/1980 | Samuelson et al. |
| 4,470,158 | A | 9/1984 | Pappas et al. |
| 4,553,273 | A | 11/1985 | Wu |
| 4,676,797 | A | 6/1987 | Anapliotis et al. |
| 4,827,496 | A | 5/1989 | Cheney |
| 5,041,139 | A | 8/1991 | Branemark |
| 5,326,365 | A | 7/1994 | Alvine |
| 5,370,701 | A | 12/1994 | Finn |
| 5,397,360 | A | 3/1995 | Cohen et al. |
| 5,713,901 | A | 2/1998 | Tock |
| 5,766,259 | A | 6/1998 | Sammarco |
| 5,782,920 | A | 7/1998 | Colleran |
| 5,824,106 | A | 10/1998 | Fournol |
| 6,102,956 | A | 8/2000 | Kranz |
| 6,106,559 | A * | 8/2000 | Meyer ................... A61F 2/76 |
| | | | 623/33 |
| 6,136,032 | A | 10/2000 | Viladot Perice et al. |
| 6,168,631 | B1 | 1/2001 | Maxwell et al. |
| 6,171,342 | B1 | 1/2001 | O'Neil et al. |
| 6,488,712 | B1 | 12/2002 | Tournier et al. |
| 6,589,281 | B2 | 7/2003 | Hyde, Jr. |
| 6,663,669 | B1 | 12/2003 | Reiley |
| 6,875,236 | B2 | 4/2005 | Reiley |
| 6,926,739 | B1 | 8/2005 | O'Connor et al. |
| 7,250,060 | B2 | 7/2007 | Trieu |
| 7,534,246 | B2 | 5/2009 | Reiley et al. |
| 7,662,189 | B2 | 2/2010 | Meswania |
| 8,128,627 | B2 | 3/2012 | Justin |
| 8,435,308 | B2 * | 5/2013 | Atteraas ................... A61F 2/78 |
| | | | 623/32 |
| 8,715,361 | B2 | 5/2014 | Reiley et al. |
| 8,715,362 | B2 | 5/2014 | Reiley et al. |
| 9,144,506 | B2 | 9/2015 | Phelps |
| 10,136,998 | B2 * | 11/2018 | Dhillon .............. A61F 2/30734 |
| 2002/0055744 | A1 | 5/2002 | Reiley |

| | | | |
|---|---|---|---|
| 2002/0095214 | A1 | 7/2002 | Hyde, Jr. |
| 2003/0204263 | A1 | 10/2003 | Justin et al. |
| 2003/0204266 | A1 | 10/2003 | Gerbec |
| 2004/0143332 | A1 | 7/2004 | Krueger et al. |
| 2004/0172138 | A1 | 9/2004 | May et al. |
| 2005/0049711 | A1 | 3/2005 | Ball |
| 2005/0182492 | A1 | 8/2005 | Pappas et al. |
| 2005/0192673 | A1 | 9/2005 | Saltzman et al. |
| 2007/0288097 | A1 | 12/2007 | Hurowitz |
| 2012/0123542 | A1 | 5/2012 | Suzuki et al. |
| 2014/0277538 | A1 | 9/2014 | Sander |
| 2016/0317327 | A1 * | 11/2016 | Ingimarsson ............. A61F 2/78 |
| 2017/0189198 | A1 | 7/2017 | Reiley et al. |
| 2020/0121477 | A1 * | 4/2020 | Lindhe ..................... A61F 2/60 |
| 2021/0267774 | A1 * | 9/2021 | Adelholt .................. A61F 2/76 |

FOREIGN PATENT DOCUMENTS

| | | |
|---|---|---|
| RU | 2145822 C1 | 2/2000 |
| RU | 2149604 C1 | 5/2000 |
| RU | 2155561 C2 | 9/2000 |
| SU | 546349 A1 | 4/1977 |
| SU | 1271509 A1 | 11/1986 |
| SU | 1533685 A1 | 1/1990 |
| WO | 9107931 A1 | 6/1991 |
| WO | 9807380 A1 | 2/1998 |
| WO | 0015154 A1 | 3/2000 |
| WO | 0119294 A1 | 3/2001 |
| WO | 02067811 A2 | 9/2002 |
| WO | 2021021246 A1 | 2/2021 |

OTHER PUBLICATIONS

Official Action in Japanese Patent Appln. No. 2008-501935, dated Dec. 22, 2010.
Official Action in Australian Patent Appln. No. 2006223238, dated Oct. 15, 2010.
Supplementary European Search Report, EP Appln. No. 06737977, dated May 22, 2013.

* cited by examiner

COUPLING SYSTEMS AND METHODS

CROSS-REFERENCE TO RELATED APPLICATION

This application claims priority to U.S. Provisional Patent Application No. 63/169,306, filed Apr. 1, 2021, the entirety of which is incorporated by reference herein.

FIELD OF DISCLOSURE

The disclosed systems and methods relate to implants. More particularly, the disclosed systems and methods relate to the joining of two or more components of a prosthesis or implant.

BACKGROUND

Medical prostheses are available to address any number of abnormalities. For example, a prosthesis may be provided to replace a joint, such as a shoulder, elbow, knee, or ankle. Each prosthesis may include one or more components, such as a stem that is to be inserted into a passageway formed along an axis of a bone, and a tray that is to be coupled to the stem. The tray may support one or more additional components, such as an articular surface formed from metal or polymer that may be coupled to the tray. In order to speed recovery and reduce complications, surgical techniques seek to minimize the size or length of an incision or access site needed to install a prosthesis. As a result, there continues to be a need to minimize the size of the implant to be installed.

SUMMARY

In some embodiments, a system includes a first component having a body extending from a first end to a second end. Each of the first and second ends including a coupling element. At least one end including a male coupling element including a detent disposed within a hole defined by a protrusion, the detent being biased by a biasing member.

In some embodiments, a system includes a first component having a body. The body has at least one female engagement element sized and configured to be engaged by a male coupling element of another component. The female engagement element includes a hole extending through the body and a shelf disposed within the hole.

In some embodiments, a method includes coupling a first component to a second component. Coupling the first component to the second component includes aligning a female engagement element provided by the first component with a male coupling component provided by the second component, and inserting the male coupling element into the female coupling element.

In some embodiments, a system includes a first component having a body extending from a first end to a second end. Each of the first and second ends includes a coupling element. At least one end includes a female coupling element having a recess that inwardly extends into the body.

In some embodiments, a system includes a first component having a body with an upper surface. The first component includes a male engagement element extending from the upper surface of the body. The male engagement element includes a protrusion and at least one projection extending from an upper surface of the protrusion.

In some embodiments, a method includes coupling a first component to a second component. Coupling the first component to the second component includes aligning a male engagement element provided by the second component with a female coupling component provided by the first component, and inserting the male coupling element into the female coupling element.

In some embodiments, a system includes a first component having a body extending from a first end to a second end. Each of the first and second ends includes a respective coupling element. At least one end having a male coupling element including a protrusion with an extension that defines a circumferential undercut.

In some embodiments, a system includes a first component and a locking device. The body includes an upper surface defining a slot that extends inwardly from a front end of the body. The locking device is configured to be received slideably within the slot defined by the first component.

In some embodiments, the system includes a second component having a second body extending from a first end to a second end. At least one end includes a male coupling element having a protrusion with an extension that defines a circumferential undercut sized and configured to receive a portion of the locking device therein.

In some embodiments, a method includes aligning a male coupling element provided by a first component with a female coupling element provided by a second component, coupling the second component to the first component by engaging the male coupling element and the female coupling element, and securing the second component to the first component using a locking device.

In some embodiments, a system includes a first component having a body. The body includes a fin extends upwardly from an upper surface of the body. The fin includes at least one extension that extends laterally from the fin.

In some embodiments, a system includes a first component extending from a first end to a second end. Each of the first and second ends including a coupling element. At least one end including a female engagement element that includes a slot that extends through the body of the first component at an angle with respect to a longitudinal axis defined by the first component.

In some embodiments, a method includes aligning a male coupling element provided by a first component to a female coupling element provided by a second component and coupling the second component to the first component by engaging the male coupling element and the female coupling element.

DETAILED DESCRIPTION

Figure 1:
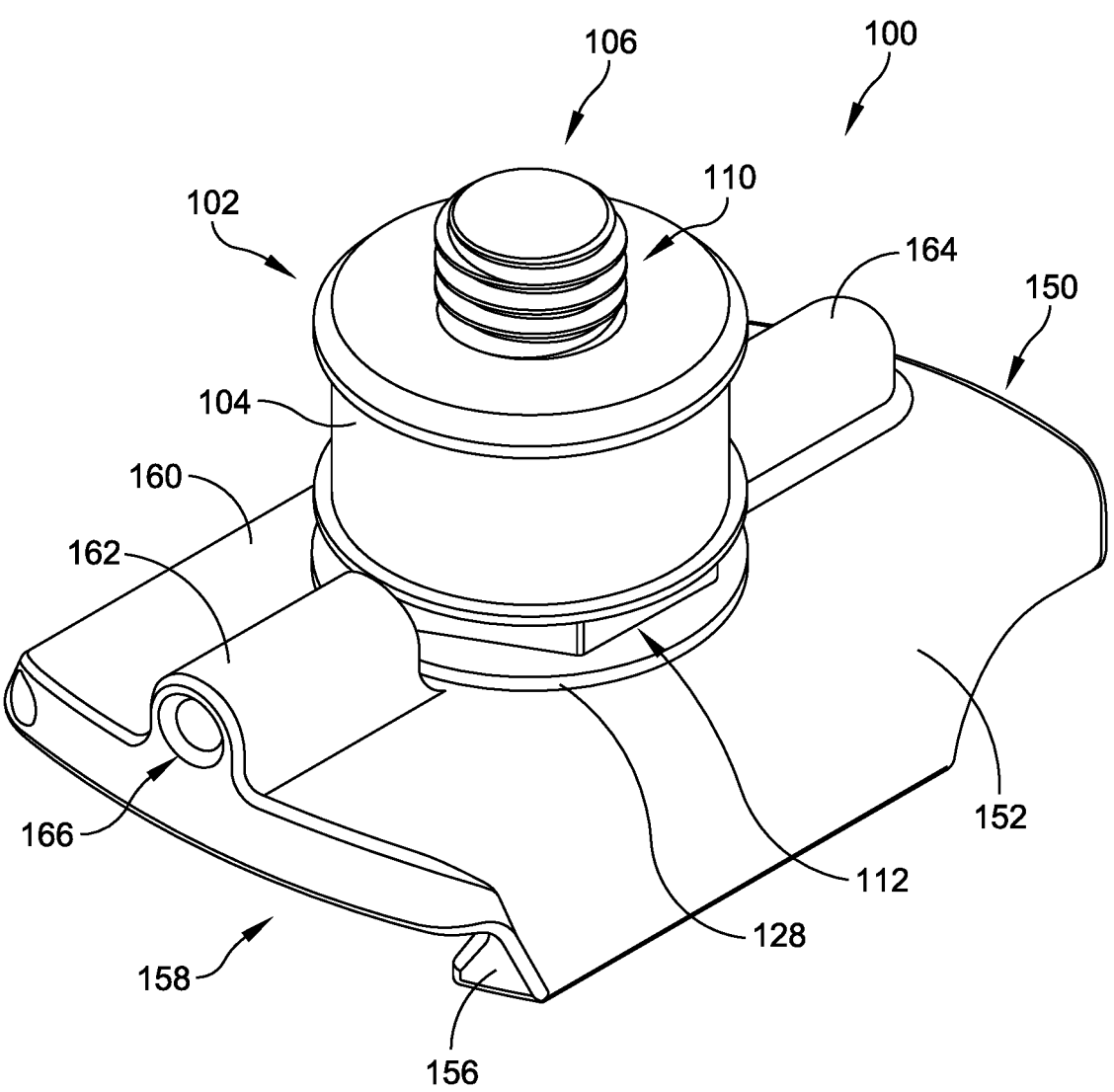
FIG. 1 is an isometric view of an example of a system having a coupling mechanism in accordance with some embodiments.
Figure 2:
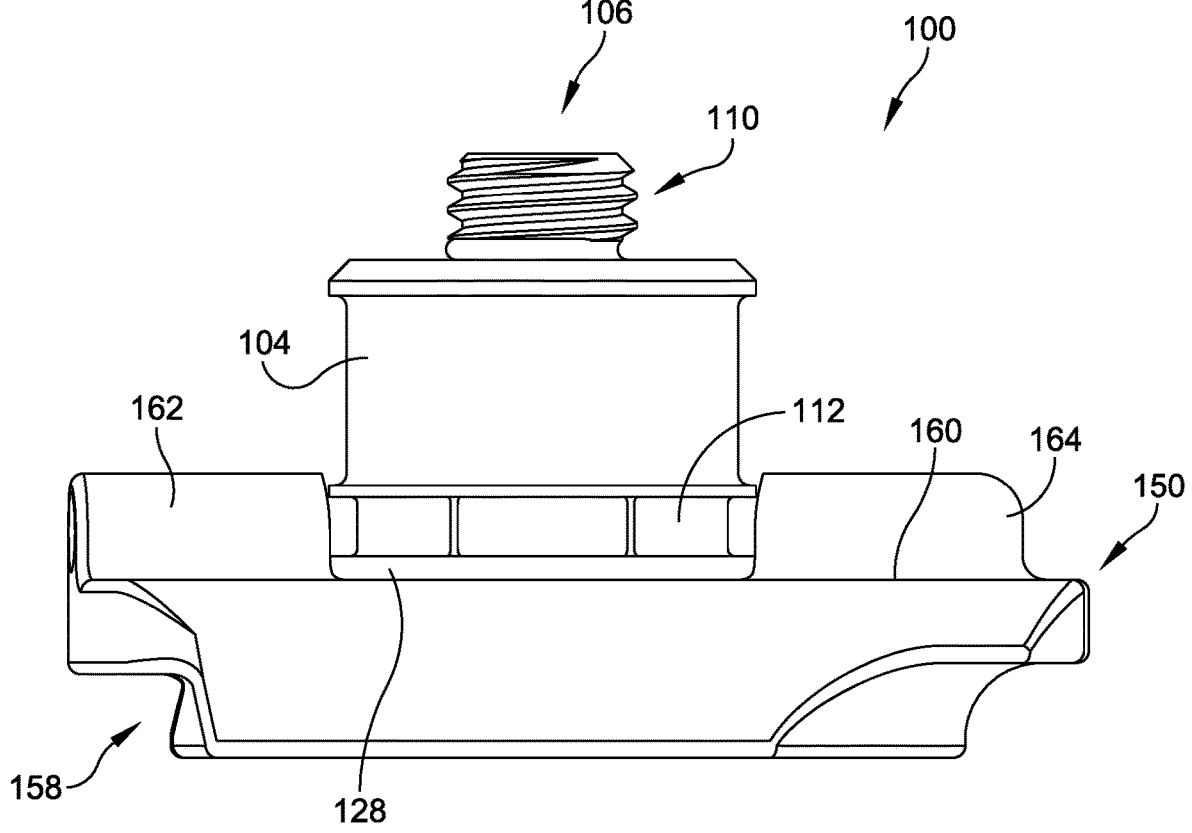
FIG. 2 is a side view of the system illustrated in FIG. 1 in accordance with some embodiments.
Figure 3:
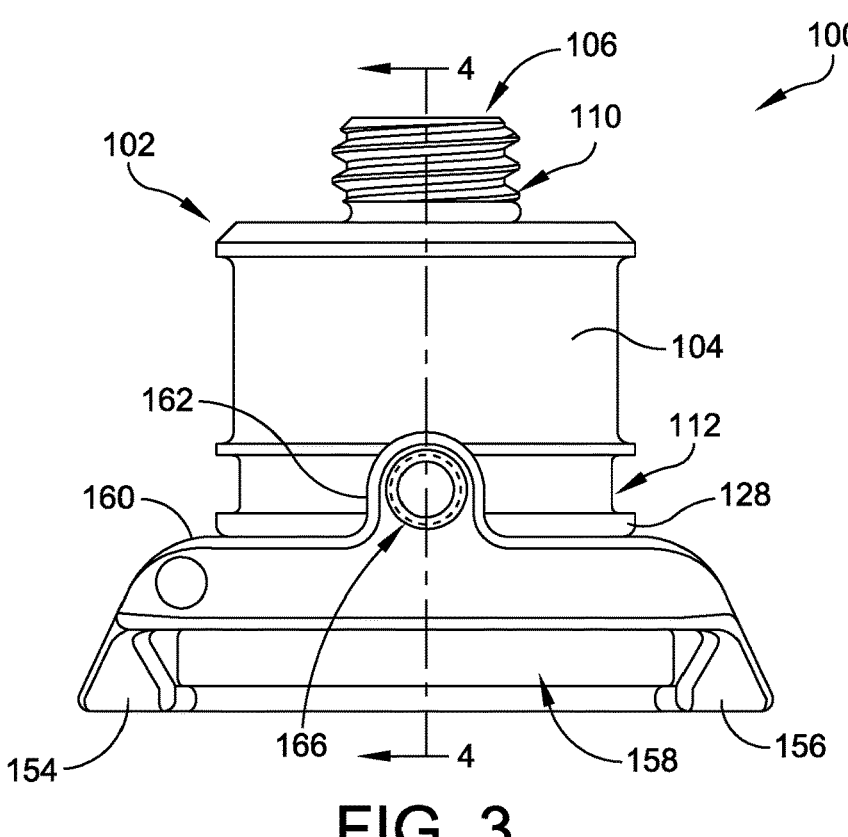
FIG. 3 is a front side view of the system illustrated in FIG. 1 in accordance with some embodiments.

This description of the exemplary embodiments is intended to be read in connection with the accompanying drawings, which are to be considered part of the entire written description.

The disclosed systems and methods provide for coupling together two or more components of a medical prosthesis and facilitate the coupling together of the various components. In some embodiments, the components may be coupled together in situ through a minimally invasive opening, although it should be understood that the components may be coupled together ex situ and implanted as a single construct. Although the following descriptions are provided with reference to an ankle prosthesis, such as the INBONE™ Total Ankle System available from the Wright Medical Group and the ankle prostheses disclosed in U.S. Pat. No. 8,715,362, entitled "Ankle Replacement System," which is incorporated by reference herein in its entirety, it should be understood that the disclosed systems and methods are not to be limited to such prosthesis and may be used in connection with any number of different prosthesis, including prostheses for joints other than ankles, such as hips, knees, and shoulders, to list only a few possible joints.

FIGS. 1-6 illustrate one example of a system 100 including a coupling mechanism in accordance with some embodiments. In some embodiments, system 100 includes a first prosthesis component 102 and a second prosthesis component 150 that may be coupled together. For example, the first prosthesis component may be a stem component 102 of a multi-component stem as disclosed in U.S. Pat. No. 8,715, 362, which was incorporated by reference above, or a monolithic stem. The stem component 102 may include a body 104 having a generally cylindrical shape extending from a first end 106 to a second end 108, it should be understood that stem component 102 may have other shapes or configurations (e.g., pyramidal, cubic, and/or oval, to list only a few possible examples).

In some embodiments, the first end 106 includes a male coupling element 110, which may take the form of a threaded protrusion. The male coupling element 110 may be sized and configured to engage a female coupling element (e.g., a threaded hole) of another component of a multi-component prosthesis stem. While male coupling element 110 is shown as a threaded protrusion, one of ordinary skill in the art will understand that male coupling element 110 may be implemented in other ways, such as a tapered protrusion or a protrusion including a detent, to identify only a couple of possibilities. Body 104 may include an engagement element 112, such as one or more flats that are sized and configured to be engaged by a tool, such as a wrench, during the coupling of the first prosthesis component 102 to another prosthesis component (e.g., to second prosthesis component 150 and/or to another stem component of a multi-component stem). One of ordinary skill in the art will understand that other engagement elements may be used instead of flats, such as the arcuate channels 513-1, 513-2 (collectively, "channels 513") described below with reference to FIGS. 22-25.

Figure 4:
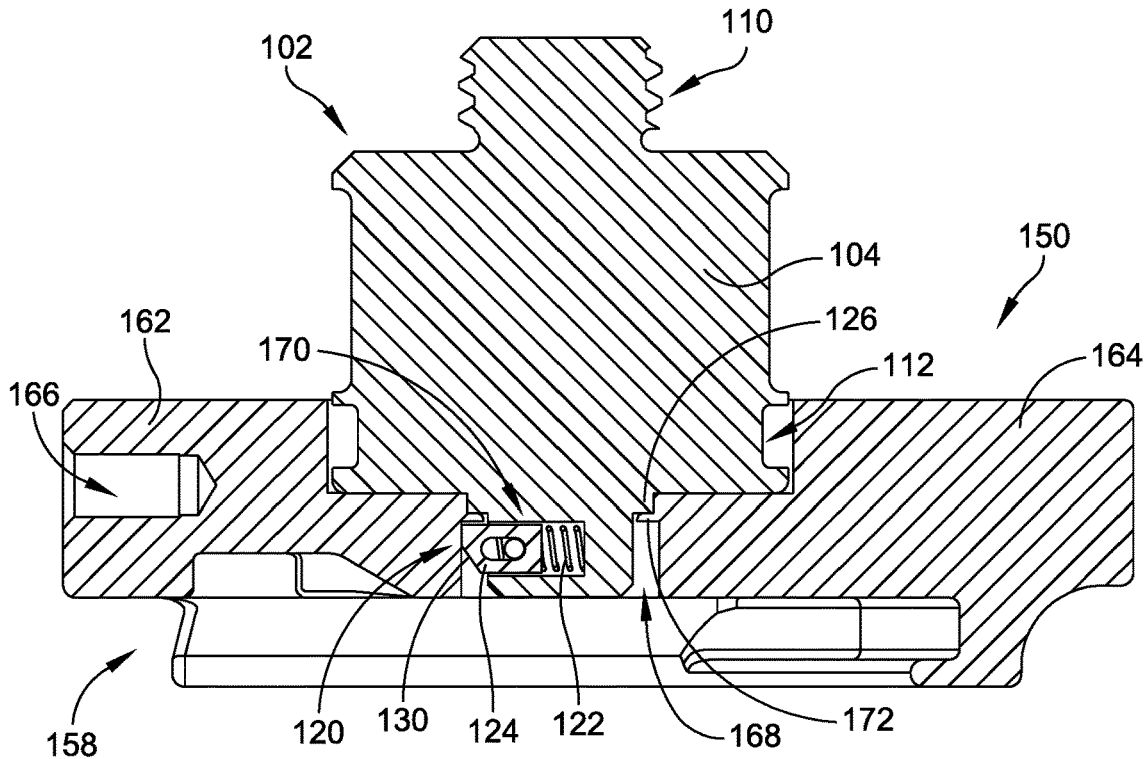
FIG. 4 is a sectional view of the system illustrated in FIG. 1 taken along line 4-4 in FIG. 3 in accordance with some embodiments.

In some embodiments, the second end 108 of prosthesis component 102 includes another male coupling element 114. Male coupling element 114 may include a protrusion 116 defining an opening 118 in which a spring-loaded detent 120 is disposed. Spring-loaded detent 120 may include a biasing element 122, such as a compression spring, and a detent 124 as best seen in FIG. 4. In some embodiments, the detent 124 is cross-pinned within opening 118 such that the detent remains coupled to, but may move relative to, protrusion 116. In some embodiments, detent 124 includes an angled face 130 to facilitate engagement with the second component 150 as described below.

Figure 5:
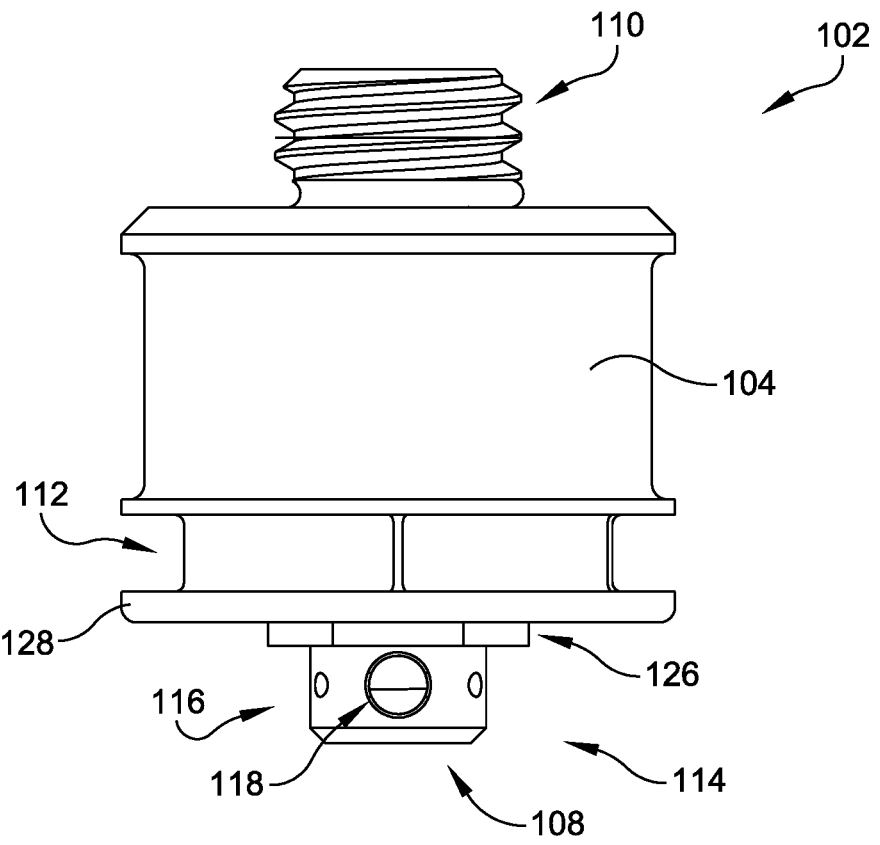
FIG. 5 is a front side view of a component of the system illustrated in FIG. 1 in accordance with some embodiments.

Second end 108 may also include a second engagement element 126. In some embodiments, second engagement element 126 is positioned between protrusion 116 and a flange 128 of body 104 as best seen in FIG. 5. Second engagement element 126 may take the form of one or more flats (e.g., a hex configuration) that is sized and configured to be received within corresponding recess defined by another prosthesis component (e.g., prosthesis component 150 and/or another stem component of a multi-component stem).

Figure 17:
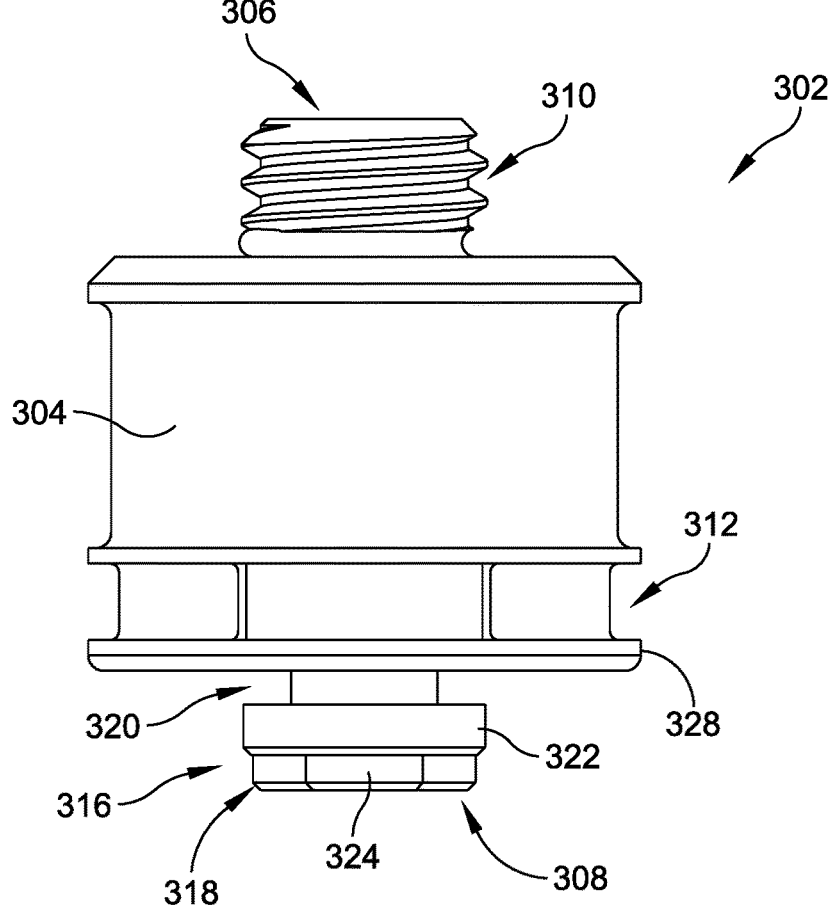
FIG. 17 is a side view of the component illustrated in FIG. 16 in accordance with some embodiments.

In some embodiments, second component 150 is a tibial tray for an ankle replacement system, such as the tibial platform 12 described in reference to FIG. 17 of U.S. Pat. No. 8,715,362, and includes a body 152 that includes a pair of spaced apart side rails 154, 156 that together define a channel 158 for receiving an artificial joint surface. The upper surface 160 of body 152 may have first and second fins 162, 164 extending therefrom. In some embodiments, the first fin 162 includes a threaded hole 166 sized and configured to receive a locking screw therein.

Figure 6:
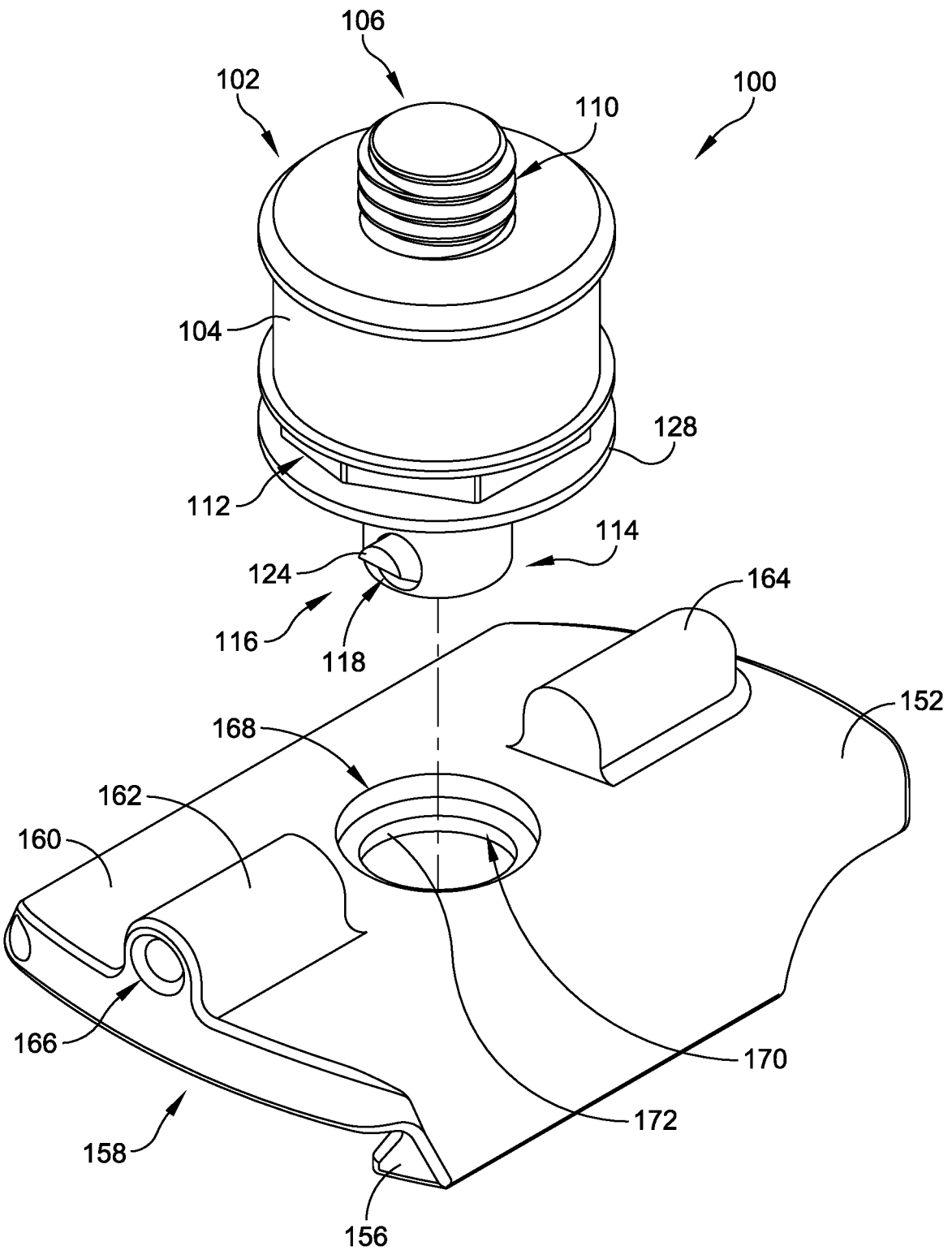
FIG. 6 is an exploded isometric view of the system illustrated in FIG. 1 in accordance with some embodiments.
Figure 7:
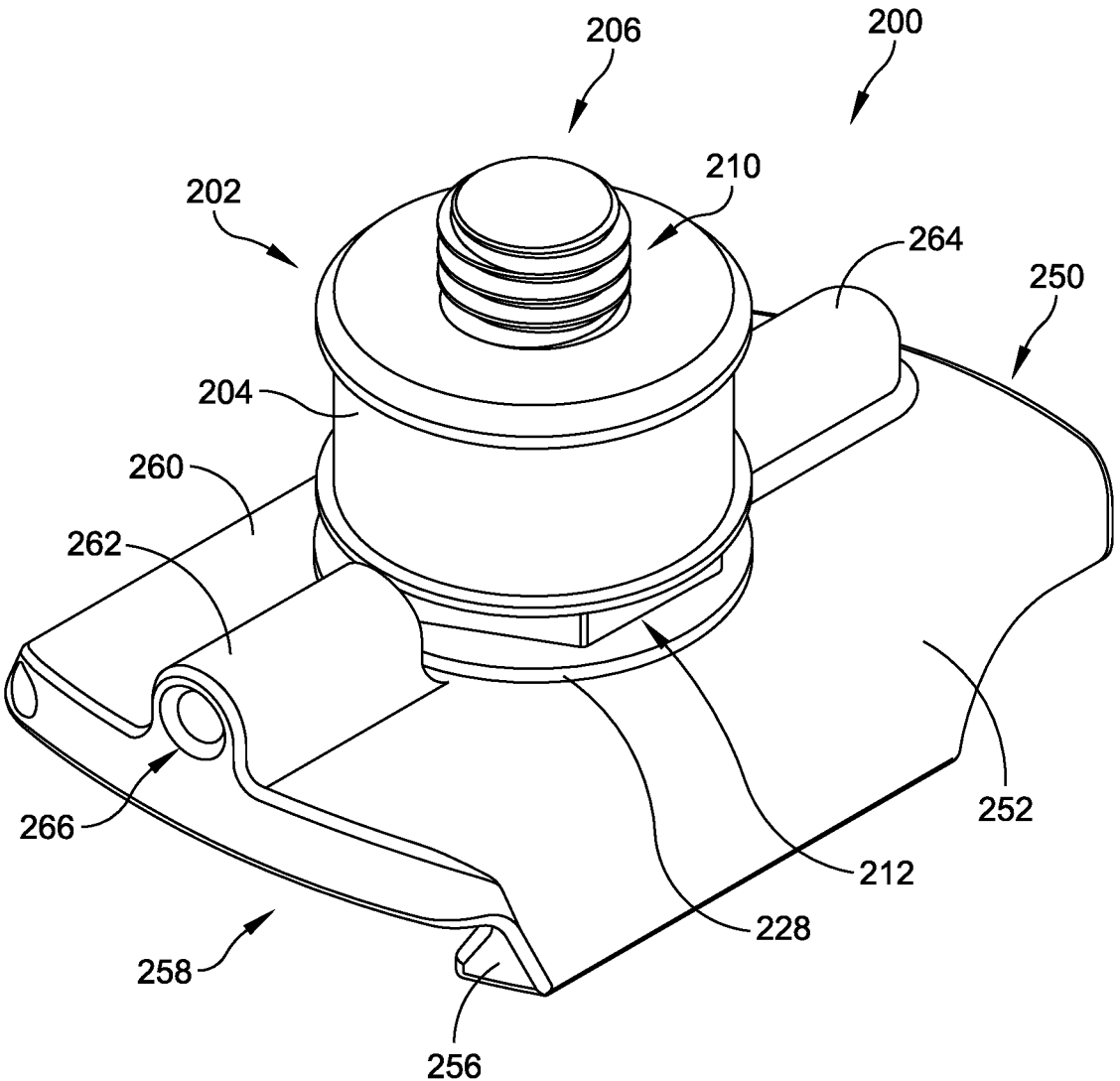
FIG. 7 is an isometric view of another example of a system having a coupling mechanism in accordance with some embodiments.
Figure 8:
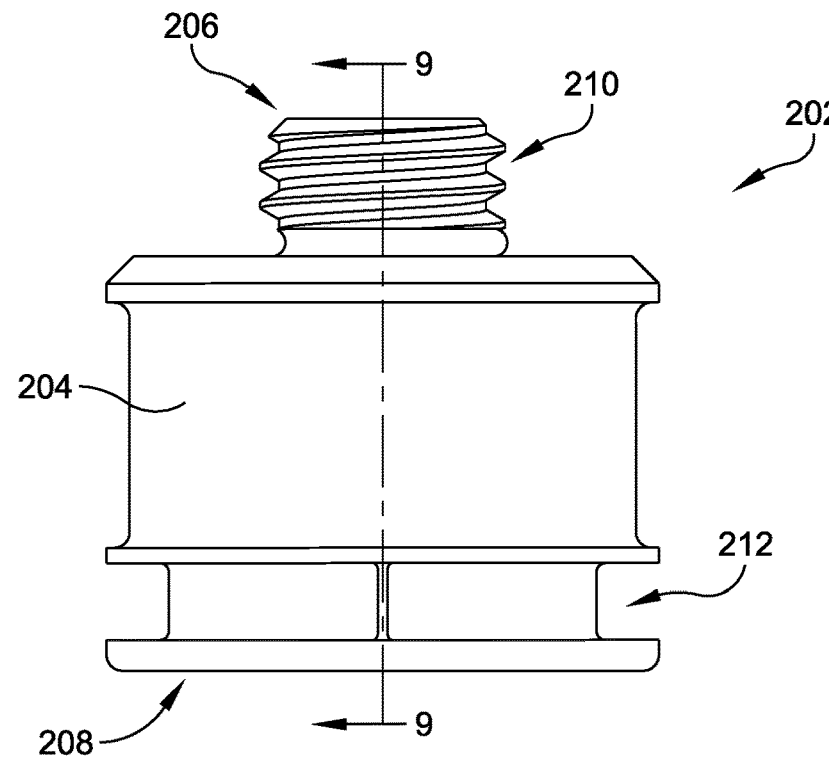
FIG. 8 is a side view of a component of the system illustrated in FIG. 7 in accordance with some embodiments.
Figure 9:
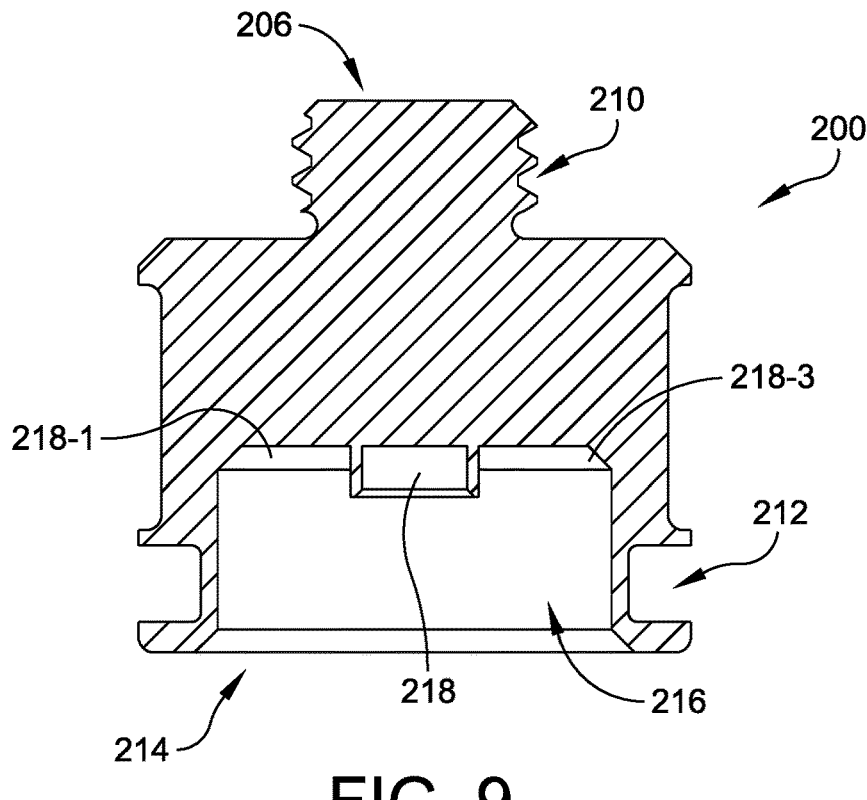
FIG. 9 is a sectional view of the component illustrated in FIG. 8 taken along line 9-9 in FIG. 8 in accordance with some embodiments.

As best seen in FIG. 6, second component 150 defines a hole 168 sized and configured to receive protrusion 116 of first component 102 therein. In some embodiments, a recessed area 170 is formed circumferentially around hole 168 to provide a shelf 172 for engaging spring-loaded detent 120 of first component 102.

In some embodiments, during use, component 102 may be coupled to another component of a prosthesis. For example, component 102 may be coupled to another stem component of a multi-component prosthesis stem as described in U.S. Pat. No. 8,715,362 via male coupling element 110, which may be threaded into a corresponding female engagement element (e.g., a threaded hole) of the other prosthesis stem component. Stem component 102 may be rotated by hand and/or by using a tool to engage engagement element 112 provided on the outer surface of body 104. One of ordinary skill in the art will understand that other engagement elements may be used instead of threads, such as a spring-loaded detent or a depression and projection.

Component 150 may be coupled to component 102 by aligning female coupling element 168 of component 150 with male coupling element 114 of component 102. Once aligned, component 150 may be pressed into engagement (e.g., by pressing in a first direction, such as upward) so that shelf 170 contacts detent 124. Component 150 is pressed until detent is retracted thereby allowing shelf 170 to pass by detent 124. Detent is urged outwardly by biasing member 122 such that shelf 170 is positioned between detent 124 and a second engagement element of component 102.

Component 150 may be disengaged from component 102 by moving (such as by deflecting) detent 124 into opening 118. In some embodiments, a tool may be used to force detent 124 into opening 118 as will be understood by one of ordinary skill in the art. With detent 124 positioned within opening 118, component 150 may be disengaged by sliding component 150 along protrusion 116.

FIGS. 7-12 illustrate another example of a system 200 having a coupling mechanism in accordance with some embodiments. In some embodiments, system 200 includes a first prosthesis component 202 and a second prosthesis component 250 that may be coupled together, either in situ or ex situ. For example, and as described above with respect to system 100, the first prosthesis component 202 may be a stem component of a multi-component stem as disclosed in U.S. Pat. No. 8,715,362, which was incorporated by reference above, or a monolithic stem. The stem component 202 may include a body 204 having a generally cylindrical shape extending from a first end 206 to a second end 208, it should be understood that stem component 202 may have other shapes or configurations (e.g., pyramidal, cubic, and/or oval, to list only a few possible examples).

In some embodiments, the first end 206 includes a male coupling element 210, which may take the form of a threaded protrusion. For example, the male coupling element 210 may be sized and configured to engage a female coupling element (e.g., a threaded hole) of another component of a multi-component prosthesis stem. While male coupling element 210 is shown as a threaded protrusion, one of ordinary skill in the art will understand that male coupling element 210 may be implemented in other ways, such as a tapered protrusion or a protrusion including a detent, to identify only a couple of possibilities. Body 204 may include an engagement element 212. Engagement element 212 may take the form of one or more flats that are sized and configured to be engaged by tool, such as a wrench, arcuate channels 513 described below with reference to FIGS. 22-25, or other shape as will be understood by one of ordinary skill in the art. Engagement element 212 may be engaged by an engagement tool when the first prosthesis component 202 is being coupled to another prosthesis component (e.g., prosthesis component 250 and/or another stem component of a multi-component prosthesis stem).

Figure 10:
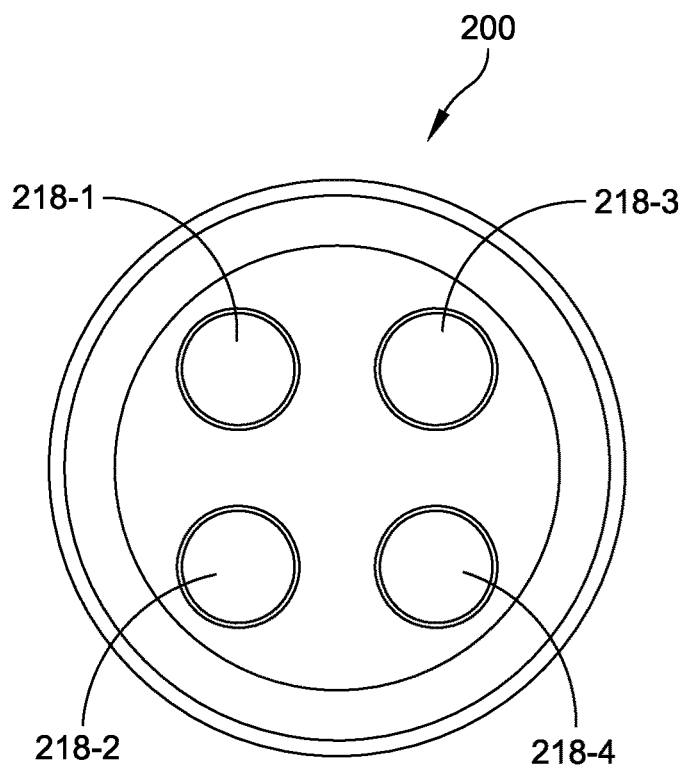
FIG. 10 is a bottom side view of the component illustrated in FIG. 8 in accordance with some embodiments.

In some embodiments, second end 208 of component 202 includes a female coupling element 214. Female coupling element 214 may take the form of a recess that is sized and configured to receive a male coupling element, such as male coupling element 268 shown in FIGS. 11 and 12. As best seen in FIG. 10, one or more depressions 218-1, 218-2, 218-3, 218-4 (collectively, "depressions 218") may be further defined within the recess 216. Although four depressions 218 are illustrated, a person of ordinary skill in the art will understand that fewer or more depressions 218 may be provided. The depressions 218 may be provided symmetrically about a central axis defined by the recess 216, or the depressions 218 may be randomly arranged within recess 216. In some embodiments, recess 216 and/or depressions 218 taper along their length such that recess 216 and/or depressions 218 are wider at their opening ends than they are at their terminal or closed ends to provide a press- or interference-fit with their male counterparts described below.

Figure 10A:
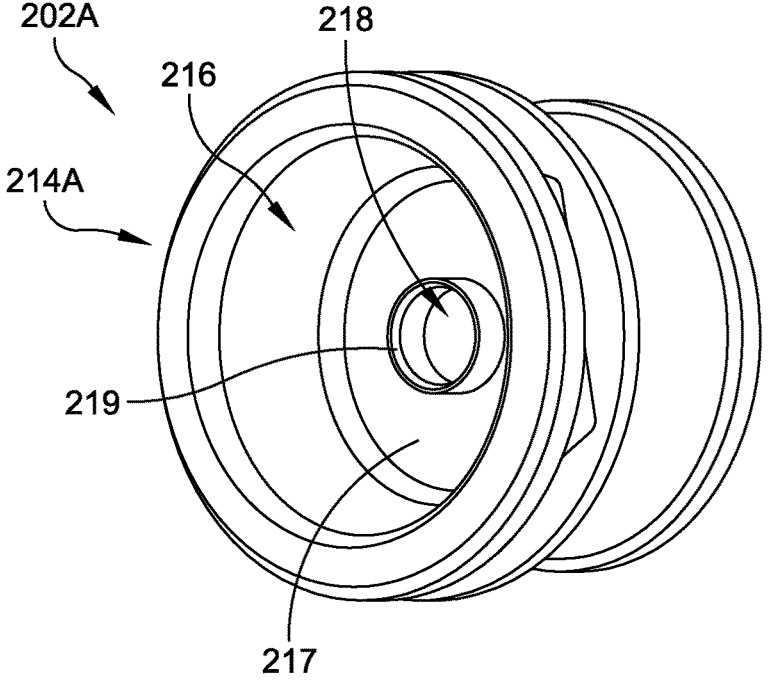
FIG. 10A is a bottom side perspective view of another example of a female coupling element of the component illustrated in FIG. 8 in accordance with some embodiments.

FIG. 10A illustrates an example of a component 202A having a female coupling element 214A including single depression 218 that is located centrally within recess 216 and a circumferential groove 217 to provide a rim 219. As discussed below, rim 219 is sized and configured to be received between projections 272 provided by component 250. Further, the presence of depression 218 within rim 219 may enable rim 219 to be "flexible" such that rim 219 may be slightly deformed in the presence of projections 272.

Figure 11:
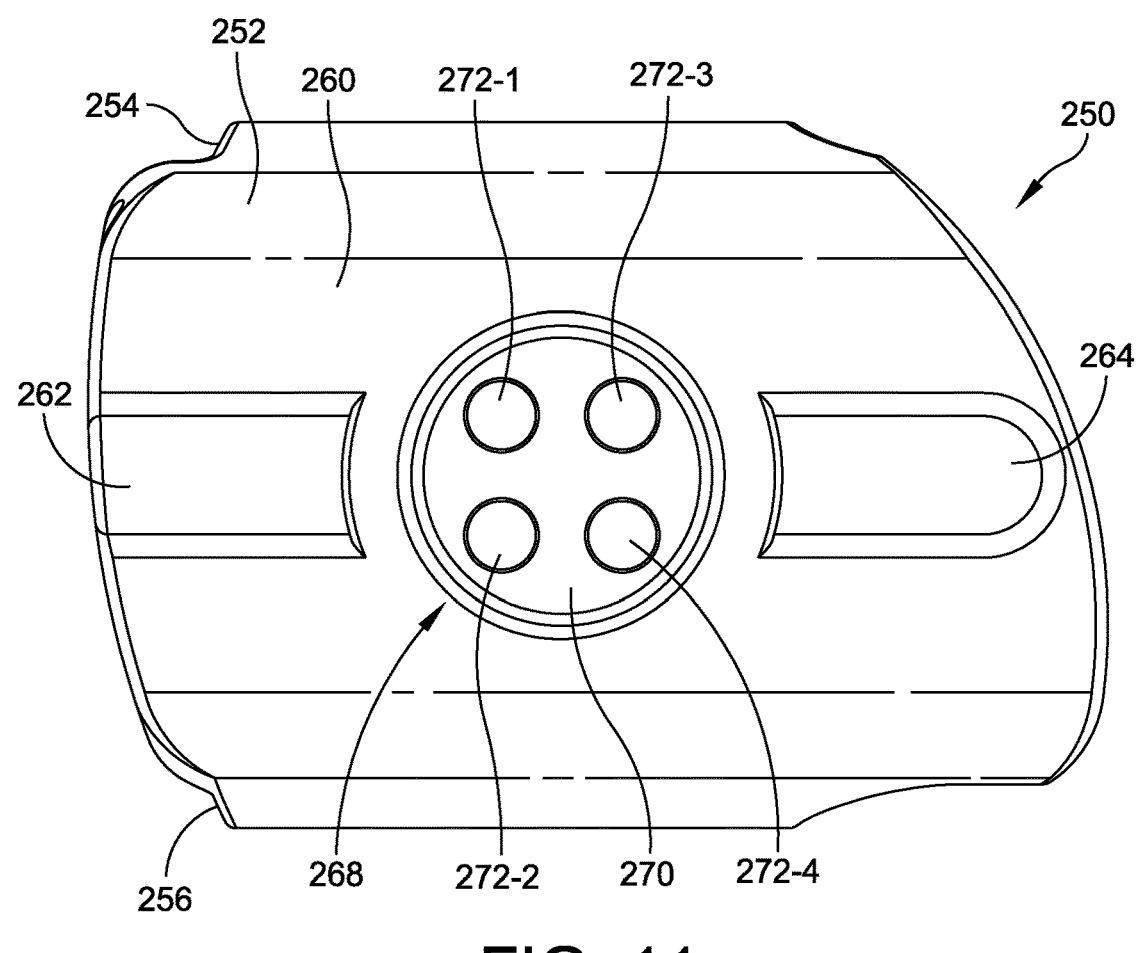
FIG. 11 is a top side view of another component of the system illustrated in FIG. 7 in accordance with some embodiments.
Figure 12:
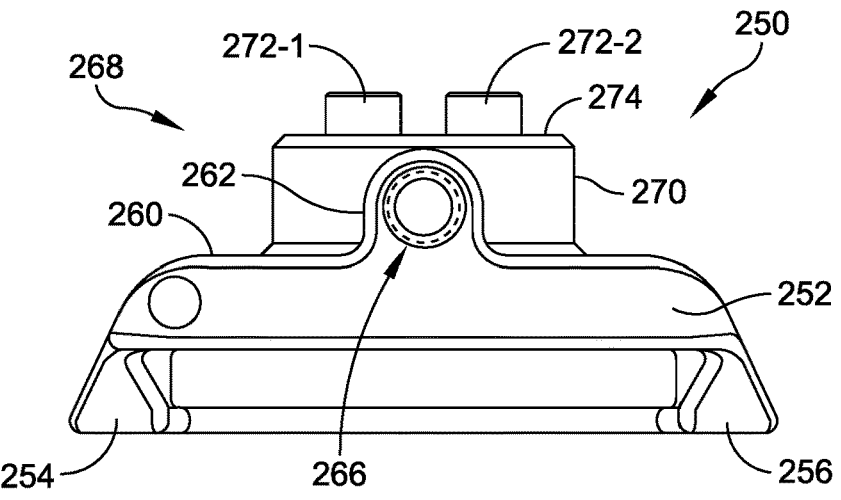
FIG. 12 is a front side view of the component illustrated in FIG. 11 in accordance with some embodiments.
Figure 13:
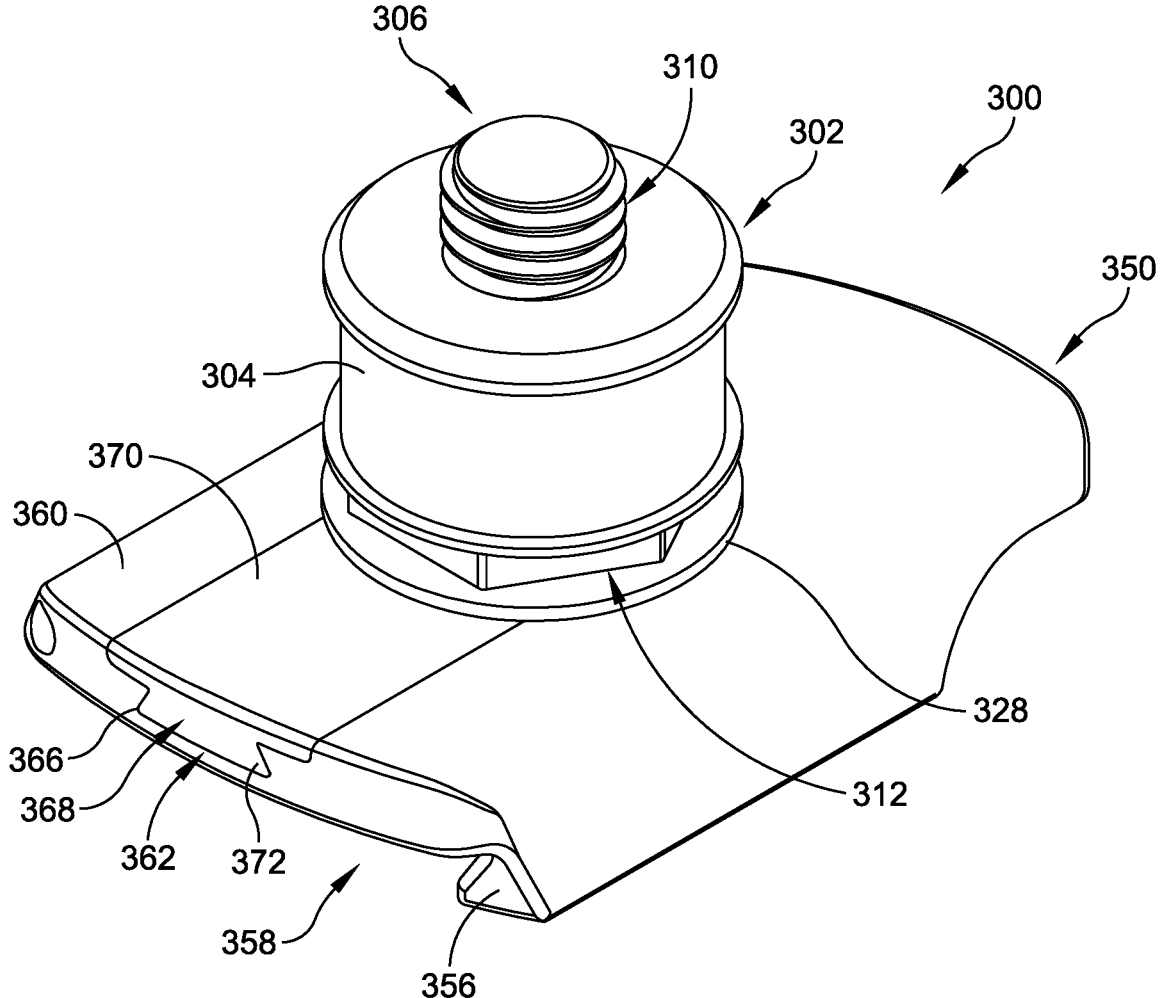
FIG. 13 is an isometric view of another example of a system having a coupling mechanism in accordance with some embodiments.

FIGS. 11-12 provide various views of one example of the second component 250. In some embodiments, second component 250 is a tibial tray for an ankle replacement system, such as the tibial platform 12 described in U.S. Pat. No. 8,715,362, which is incorporated by reference herein. Component 250 has a body 252 including a pair of spaced apart side rails 254, 256 that together define a channel 258. Channel 258 may be sized and configured to receive an artificial joint surface as described in U.S. Pat. No. 8,715, 362.

The upper surface 260 of component 250 may include a first fin 262, which may be positioned toward the front of component 250, and a second fin 264, which may be positioned toward the rear of component 250. As best seen in FIG. 12, fin 262 defines hole 266, which may be threaded. Upper surface 260 also includes a male coupling element 268, which may take the form of a locking protrusion 270. Locking protrusion 270 is sized and configured to be received within recess 216 of female locking element 214 defined by first component 202. Although locking protrusion 270 is shown as having a generally cylindrical shape, it should be understood that locking protrusion 270 may have other shapes or configurations (e.g., pyramidal, cubic, and/or oval, to list only a few examples). Further, it should be appreciated that additional protrusions may be provided on the upper surface 260 of component 250.

In some embodiments, one or more projections 272-1, 272-2, 272-3, 272-4 (collectively, "projections 272") extend from the upper surface 274 of protrusion 268. Although four projections 272 are shown, it should be understood that fewer or more projections 272 may be provided. Projections 272 are shown as having a generally cylindrical shape, but one of ordinary skill in the art will understand that projections 272 may have other shapes or configurations (e.g., pyramidal, cubic, and/or oval, to list only a few examples). Further, while projections 272 are shown as being symmetrically arranged about a central longitudinal axis defined by the protrusion 270, projections 272 may be arranged otherwise so long as they correspond to the locations of depressions 218.

In some embodiments, protrusion 270 and/or projections 272 are tapered along their length. For example, the diameter or widthwise dimension of protrusion 270 and/or projections 272 at their respective base or bottom may be greater than the diameter or widthwise dimension of protrusion 270 and/or projections 272 at their respective peaks or tops. One of ordinary skill in the art will understand that the degree of taper may vary to provide the desired amount of fixation and/or engagement between protrusion 270 and recess 216 and between projections 272 and depressions 218. In some embodiments, protrusion 270 and/or projections 272 do not taper along their length (e.g., are cylindrical). Projections 272 may be configured to engage a rim 219 that encircles a single depression 218 as described above with reference to FIG. 10A.

In use, the component 202 may be coupled to another stem component via the male coupling element 210. For example, and as described in the U.S. Pat. No. 8,715,362, the threaded protrusion of male coupling element 210 may be threaded into engagement with a corresponding female coupling element (e.g., a threaded hole) of the other stem component. Stem component 202 may be rotated by hand and/or by using a tool to engage engagement element 212 provided on the outer surface of body 204. One of ordinary skill in the art will understand that other engagement elements may be used instead of threads, such as a spring-loaded detent, or a depression and projections, for example.

Component 250 may be coupled to component 202 by aligning and inserting male coupling element 268 of component 250 into female coupling element 214 of component 202. More particularly, protrusion 270 and projections 272 of male coupling element 268 are aligned with recess 216 and depressions 218 of female coupling element 214 such that protrusion 270 and projections 272 may be inserted into recess 216 and depressions 218, respectively. The respective dimensions of projections 272 and depressions 218 provides a coupling between components 202, 250, and the engagement of projections 272 and depressions 218 prevent rotation between components 202, 250. If desired, a set or locking screw may be threaded into hole 266 to provide further securement of the two components 202, 250 as will be understood by one of ordinary skill in the art.

Component 250 may be coupled to component 202A (shown in FIG. 10A) by aligning and inserting male coupling element 268 of component 250 into female coupling element 214A of component 202A. More particularly, protrusion 270 and projections 272 of male coupling element 268 are aligned with recess 216 and depression 218 and rib 219 of female coupling element 214A such that protrusion 270 may be inserted into recess 216 such that projections 272 engage rib 219, which may flex inwardly into depression 218. The respective dimensions of projections 272 and rib 219 provides a coupling between components 202A, 250.

FIGS. 13-17 illustrate another example of a system 300 having a coupling mechanism in accordance with some embodiments. In some embodiments, system 300 includes a first prosthesis component 302 and a second prosthesis component 350 that may be coupled to the first prosthesis component, either in situ or ex situ. For example, and as described above with respect to systems 100, 200, prosthesis component 302 may be a stem component of a multi-component stem or monolithic stem and component 350 may be a tibial tray as disclosed in U.S. Pat. No. 8,715,362, which was incorporated by reference above. Stem component 302 has a body 304, which may have a generally cylindrical shape extending from a first end 306 to a second end 308, it should be understood that stem component 302 may have other shapes or configurations (e.g., pyramidal, cubic, and/or oval, to list only a few possible examples).

In some embodiments, first end 306 includes a male coupling element 310, which may take the form of a threaded protrusion. For example, the male coupling element 310 may be sized and configured to engage a female coupling element (e.g., a threaded hole) of another component, such as another component of a multi-component prosthesis stem. While male coupling element 310 is shown as a threaded protrusion, one of ordinary skill in the art will understand that male coupling element 310 may be implemented in other ways, such as a tapered protrusion or a protrusion including a detent, to identify only a couple of possibilities. Body 304 may include an engagement element 312 that is sized and configured to be engaged by a tool during implantation or removal. In some embodiments, the engagement element 312 may take the form of one or more flats, arcuate channels 513 described below with reference to FIGS. 22-25, or other shape that may be engaged by a tool as will be understood by one of ordinary skill in the art.

As best seen in FIG. 17, second end 308 of component 302 includes a male coupling element 316, which may have a different form and configuration from male coupling element 310. More particularly, in some embodiments, male coupling element 316 includes a protrusion 318 having an undercut 320 disposed between flange 328 of body 304 and a ledge 322 of protrusion 318. In some embodiments, protrusion 318 includes an engagement element 324, which may take the form of one or more flats, curved notches, or other features that may be manipulated by a tool as will be understood by one of ordinary skill in the art.

Second component 350 has a body 352 including a pair of spaced apart side rails 354, 356 that together define a channel 358. In some embodiments, channel 358 is sized and configured to receive an artificial joint surface as described in U.S. Pat. No. 8,715,362. The upper surface 360 of component 350 may define a slot 362 that extends inwardly from front side 364. In some embodiments, slot 362 has includes an engagement recess 366, such as an undercut providing a dovetail connection. For example, the combination of slot 362 and engagement recess 366 are configured to receive a locking device 368. Locking device 368 may take a variety of forms or configurations as will be understood by one of ordinary skill in the art. In some embodiments, such as the embodiment illustrated in FIGS. 13 and 15, locking device 368 has an elongate body 370 having a trapezoidal (e.g., dovetail) extension 372 that is configured to be received within engagement recess 366. Locking device 368 is dimensioned such that it may be slid into and out of (i.e., along) slot 362 and engagement recess 366. In some embodiments, locking device 368 may include a detent or be tapered along its length such that when locking device 368 is fully inserted into slot 362 and engagement recess 366 it is retained within and by slot 362 and/or engagement recess 366.

Figure 14:
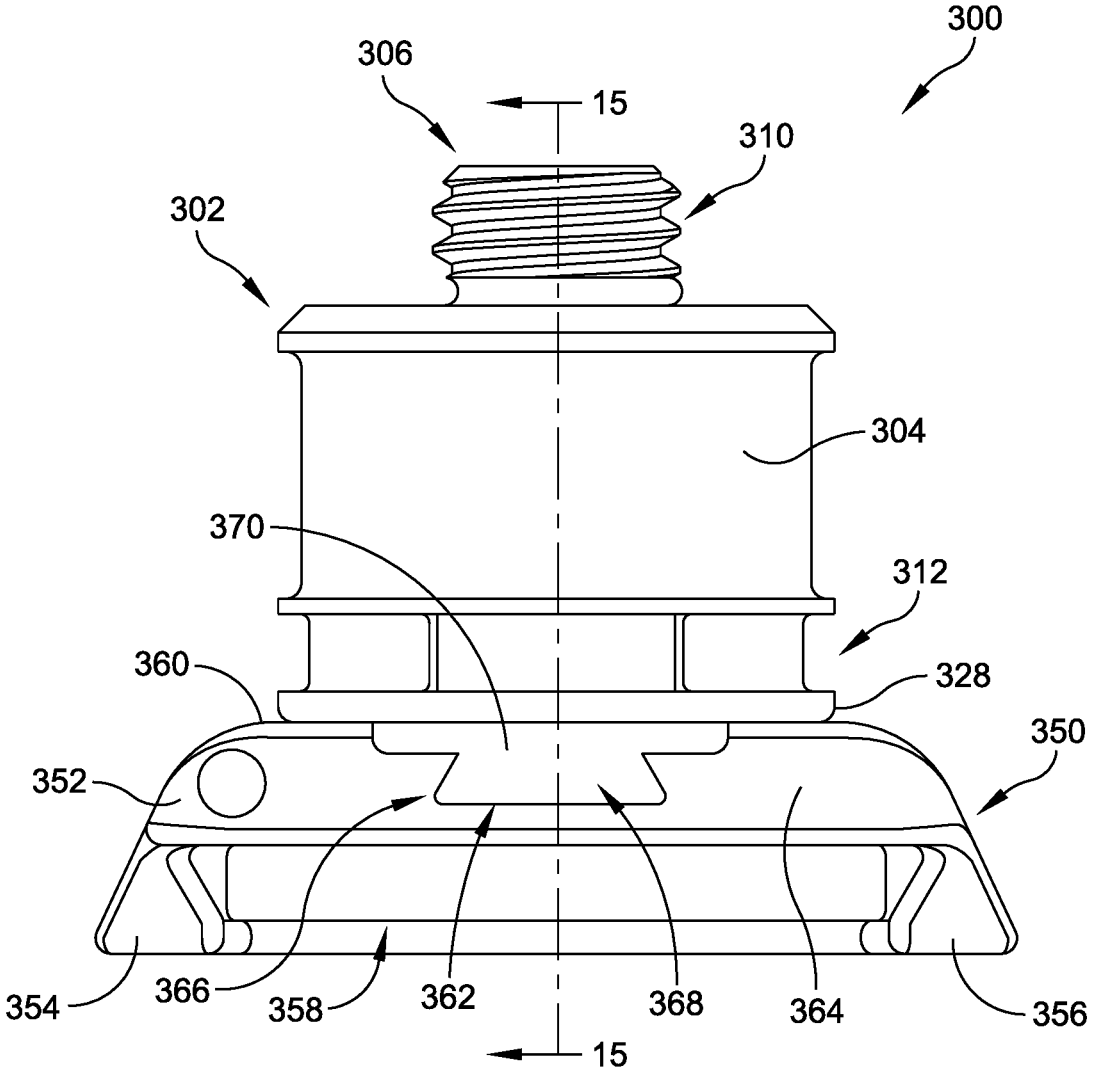
FIG. 14 is a front side view of the system illustrated in FIG. 13 in accordance with some embodiments.
Figure 15:
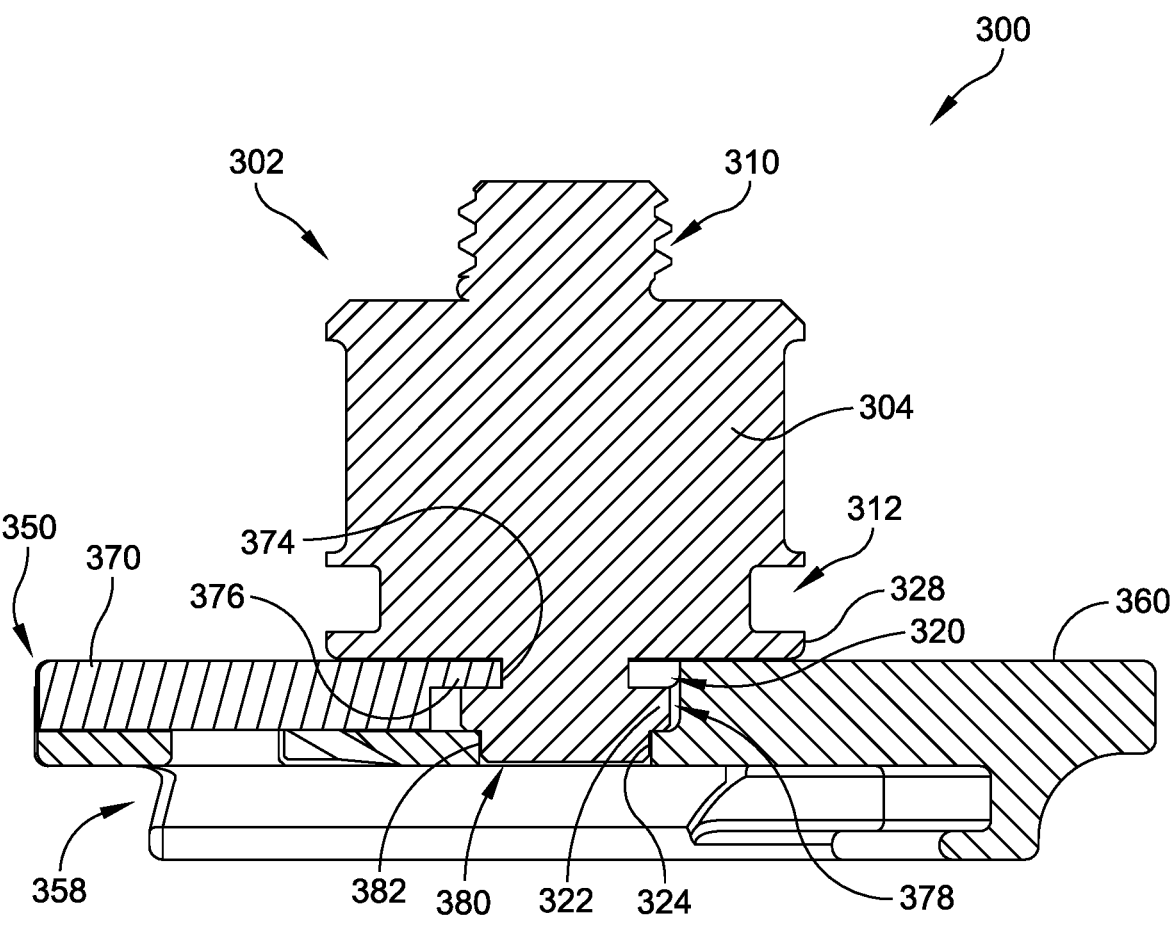
FIG. 15 is a sectional view of the system illustrated in FIG. 13 taken along line 15-15 in FIG. 14 in accordance with some embodiments.
Figure 16:
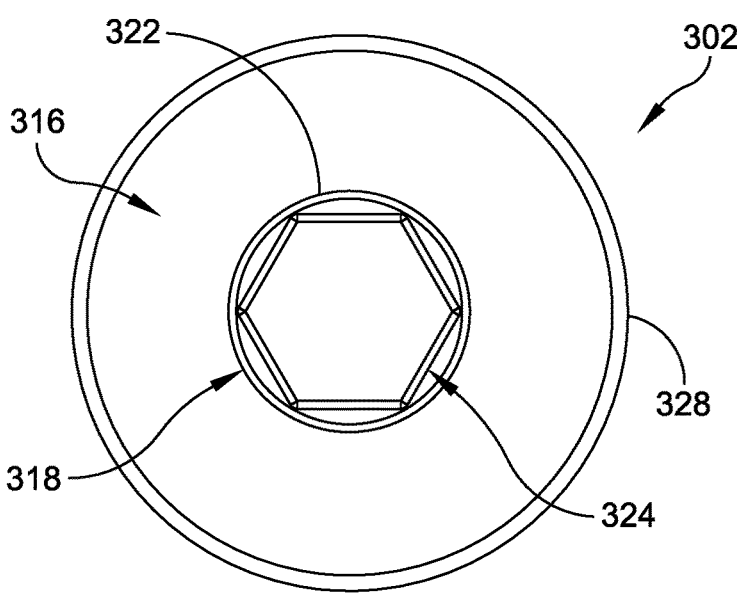
FIG. 16 is a bottom side view of one component of the system illustrated in FIG. 13 in accordance with some embodiments.

As best seen in FIG. 15, which is a cross-sectional view of system 300 taken along line 15-15 in FIG. 14, leading end 374 of locking device 368 includes an extension 376 sized and configured to be received within undercut 320 between flange 328 and ledge 322 of first component 302. Leading end 374 may be curved or have a complementary shape to the shape of the protrusion 318 within the undercut 320. Still referring to FIG. 15, component 350 may include a female coupling element 378, including a hole 380 that extends through from the upper surface 360 into channel 358 and is sized and configured to receive male coupling element 316 of component 302. In some embodiments, female coupling element 378 includes an engagement element 382 that is complementary to engagement element 324 of component 302. For example, engagement elements 324, 382 each may have a respective flat surface that align and/or abut with one another when male coupling element 316 is received within female coupling element 378, although one of ordinary skill in the art will understand that engagement elements 324, 382 may take other forms. Engagement elements 324, 382 may ensure components 302, 350 are properly aligned and/or resist or prevent relative movement between components 302, 350.

In use, component 302 may be coupled to another component via the male coupling element 310. For example, and as described in U.S. Pat. No. 8,715,362, the threaded protrusion of male coupling element 310 may be threaded into engagement with a corresponding female coupling element (e.g., a threaded hole) of the other stem component. Stem component 302 may be rotated by hand and/or by using a tool to engage engagement element 312 provided on the outer surface of body 304. One of ordinary skill in the art will understand that other engagement elements may be used instead of threads, such as a spring-loaded detent or a depression and projections, for example.

Component 350 may be coupled to component 302 by aligning and inserting male coupling element 316 of component 302 with and into female coupling element 378. More particularly, with the locking device 368 in a retracted position (e.g., either fully separated from component 350 or not fully inserted into and received within slot 362 and recess 366), the female coupling element 378 is aligned and then moved into engagement with male coupling element 316 such that protrusion 318 is received within hole 380 and engagement element(s) 324 of component 302 engage engagement element(s) 382 of component 350.

Once the male coupling element 316 is fully received within female coupling element 378, the locking device 368 may be moved from the retracted position into a fully inserted position by sliding locking device 368 along slot 362 and recess 366. In some embodiments, locking device 368 contacts the protrusion 318 within undercut 320 when locking device 368 is fully inserted.

FIGS. 18-21 illustrate another example of a system 400 with a coupling mechanism in accordance with some embodiments. In some embodiments, system 400 includes a first component 402 and a second component 450 that may be coupled to the first component. First component 402 may be a prosthesis stem component of a multi-component stem or monolithic stem, and component 450 may be a tibial tray as disclosed in U.S. Pat. No. 8,715,362, which was incorporated by reference above.

Stem component 402 may have a body 404 with a generally cylindrical shape extending from a first end 406 to a second end 408, it should be understood that stem component 102 may have other shapes or configurations (e.g., pyramidal, cubic, and/or oval, to list only a few possible examples). First end 406 includes a male coupling element 410 sized and configured to engage a female coupling element of another component of a multi-component prosthesis stem. While male coupling element 410 is shown as a threaded protrusion, one of ordinary skill in the art will understand that male coupling element 410 may be implemented in other ways, such as a tapered protrusion or a protrusion including a detent, to identify only a couple of possibilities. Body 404 may include an engagement element 412 that may be engaged by a tool during implantation and/or removal of the system 400. In some embodiments, engagement element 412 includes one or more flats to be engaged by a tool, such as a wrench, or may include arcuate channels that are engageable by a tool, such as the arcuate channels 513 that are engageable by tool 580 as described below in connection with FIGS. 22-25. Body 404 may also include a flange 428 disposed adjacent to engagement element 412 that extends around the circumference of body 404 and interrupted by slot 418.

Figure 18:
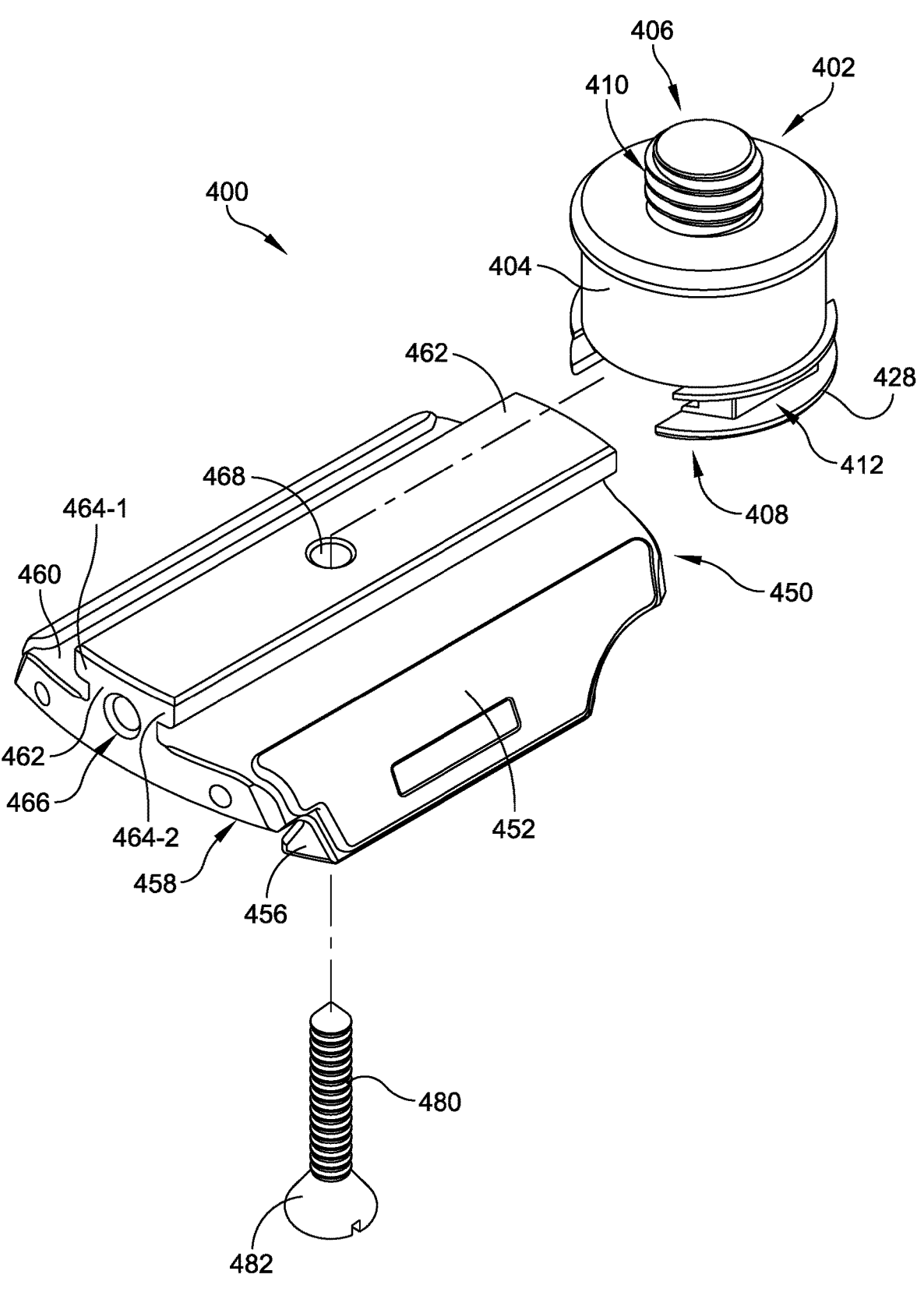
FIG. 18 is an exploded isometric view of another example of a system having a coupling mechanism in accordance with some embodiments.
Figure 19:
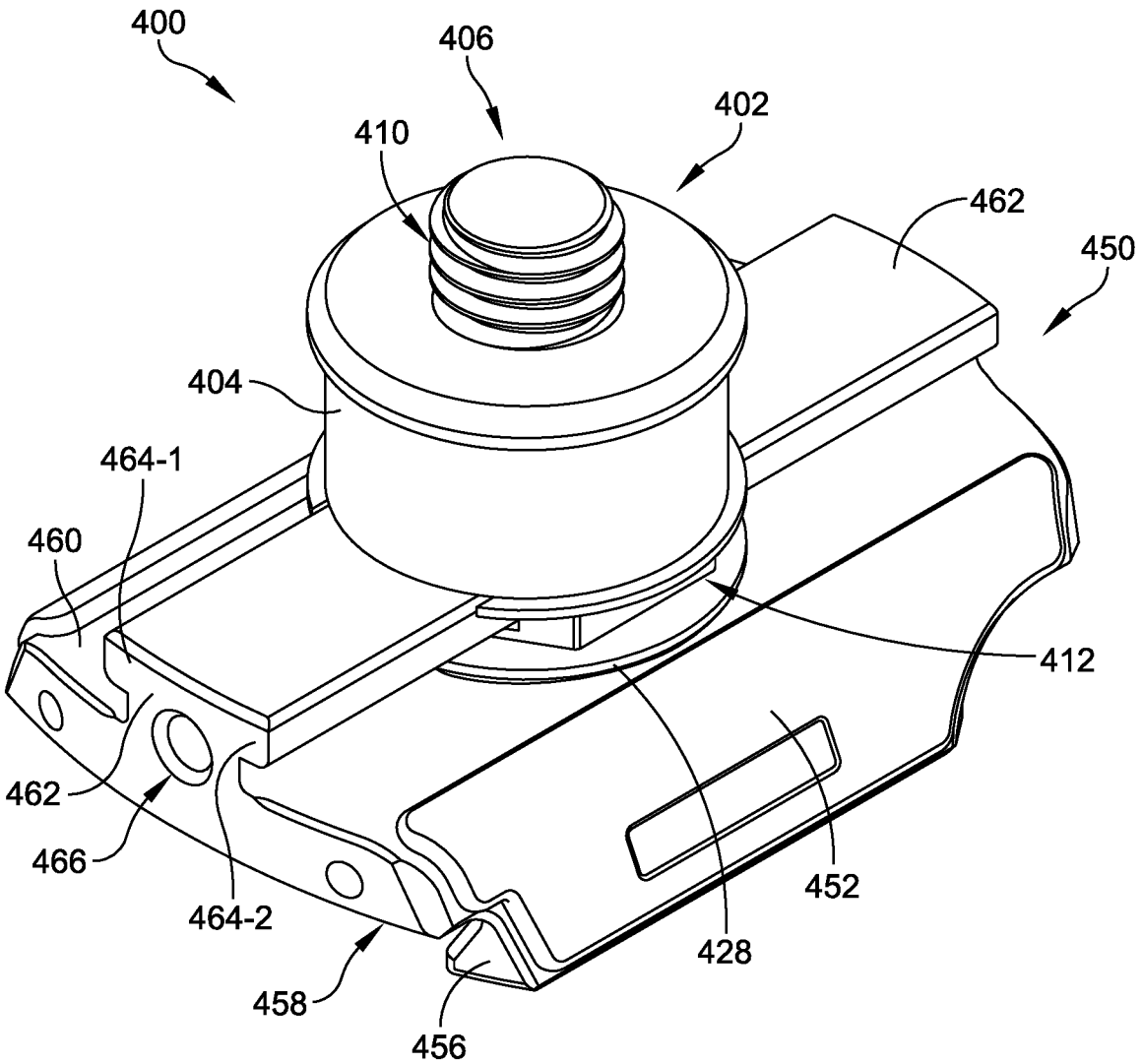
FIG. 19 is an isometric view of the system illustrated in FIG. 18 in accordance with some embodiments.
Figure 20:
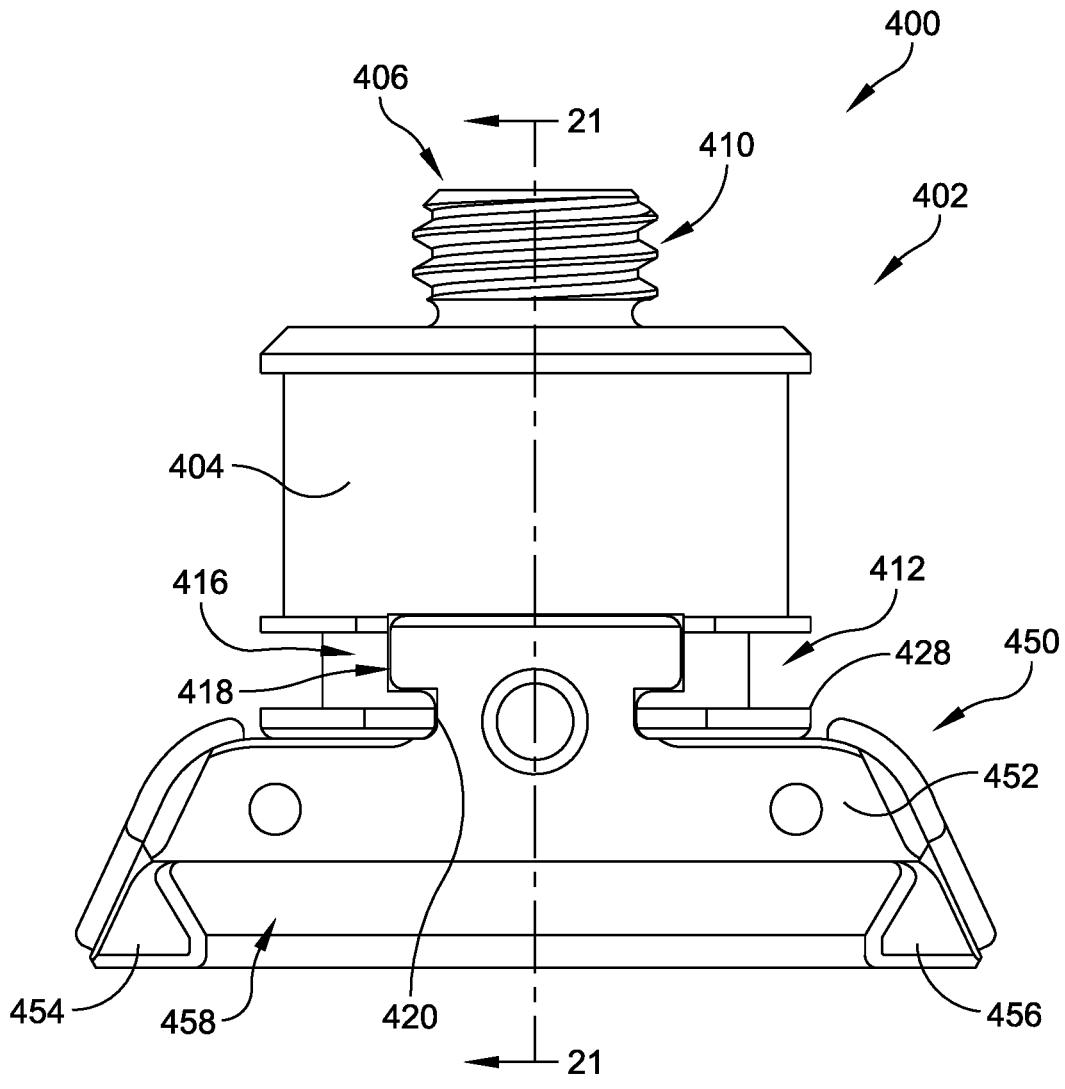
FIG. 20 is a front side view of the system illustrated in FIG. 18 in accordance with some embodiments.
Figure 21:
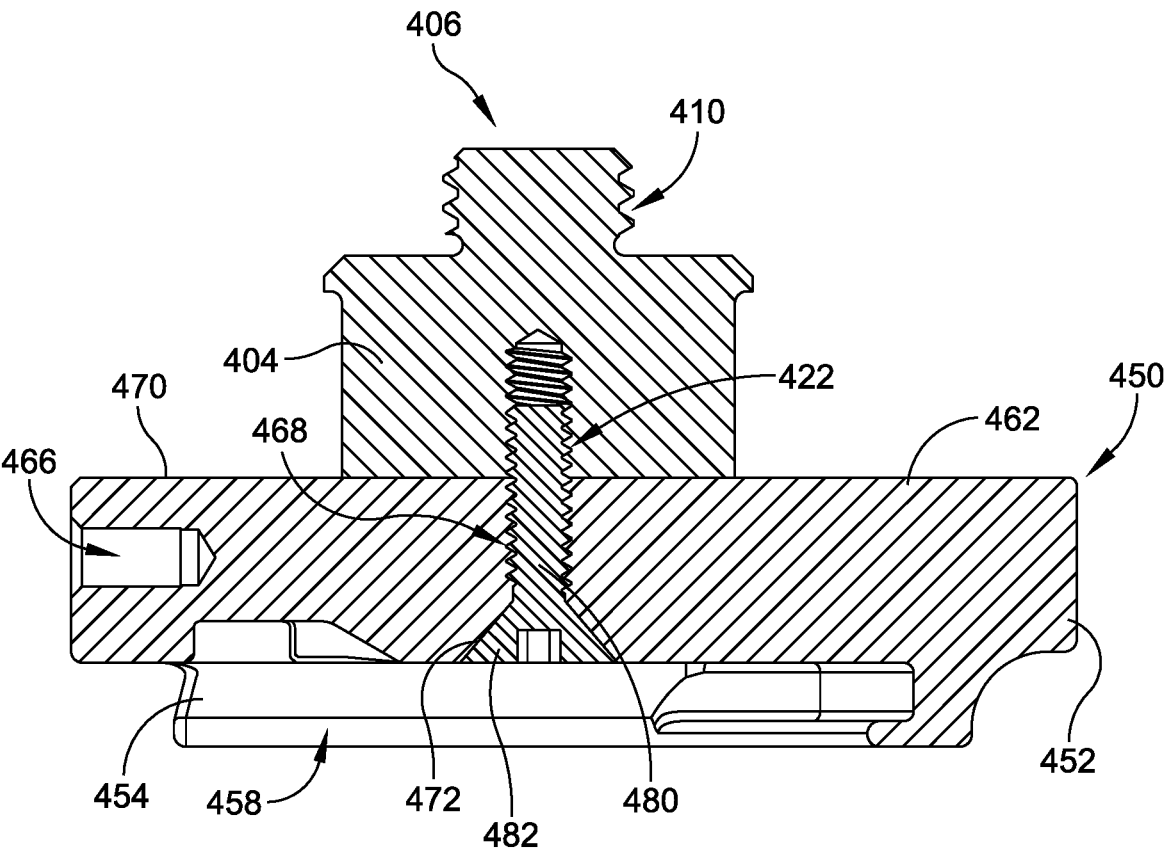
FIG. 21 is a sectional view of the system illustrated in FIG. 18 taken along line 21-21 in FIG. 20 in accordance with some embodiments.

As best seen in FIGS. 18-20, second end 408 of component 402 includes a female coupling element 416. In some embodiments, female coupling element 416 includes a slot 418 that extends through body 404 perpendicular to a central axis defined by body 404. Slot 418 may include a portion 420 having a reduced width or diameter compared to another portion of slot 418 such that portion 420 forms a neck. In some embodiments, female coupling element 416 also includes a hole 422 extending inwardly within slot 418 as best seen in FIG. 21. Hole 422 may be at least partially threaded and sized and configured to receive a bolt, screw, ball plunger, or other threaded fastener 480 as will be understood by one of ordinary skill in the art.

Second component 450 has a body 452, which may include a pair of spaced apart side rails 454, 456 that together define a channel 458. In some embodiments, channel 458 is sized and configured to receive an artificial joint surface as described in U.S. Pat. No. 8,715,362. The upper surface 460 of component 450 includes a fin 462 extending along the length of component 450. Fin 462 may include lateral extensions 464-1, 464-2 (collectively, "extensions 464"). As will be understood by one of ordinary skill in the art, extensions 464 are sized and configured to engage slot 418 defined by component 402. Although the extensions 464 are shown as having a generally rectangular shape, one of ordinary skill in the art will understand that extensions 464 may have other shapes, such as a dovetail shape, for example. Fin 462 may also define a hole 466, which may be a blind or through hole.

As best seen in FIG. 18, component 450 may also define a hole 468 that extends through body 452 such that hole 468 extends from upper surface 470 of fin 462 to channel 458. In some embodiments, hole 468 is threaded as shown in FIG. 21, although one of ordinary skill in the art will understand that hole 468 may not be threaded, but instead dimensioned to provide clearance for a fastener 480. Hole 468 may include a countersink 472 sized and configured to receive the head 482 of fastener 480 such that the head 482 does not protrude into or interference with channel 458.

In use, component 402 may be coupled to another component via the male coupling element 410. For example, and as described in U.S. Pat. No. 8,715,362, the threaded protrusion of male coupling element 410 may be threaded into engagement with a corresponding female coupling element (e.g., a threaded hole) of the other stem component. Stem component 402 may be rotated by hand and/or by using a tool to engage engagement element 412 provided on the outer surface of body 404. One of ordinary skill in the art will understand that other engagement elements may be used instead of threads, such as a spring-loaded detent or a depression and projections, for example.

Component 450 may be coupled to component 402 by aligning fin 462 (and extensions 464) with slot 418 defined by component 402 and then inserting fin 462 into slot 418. Component 450 may be slid relative to component 402 until hole 468 defined by component 450 is aligned with hole 422 defined by component 402. In some embodiments, fin 462 may include a stop (e.g., a protrusion) that engages a feature of component 402 when component 450 is properly aligned with component 402. With holes 422, 468 aligned with one another, fastener 480 may be inserted into the holes 422, 468 as will be understood by one of ordinary skill in the art.

FIGS. 22-25 illustrate another example of a system 500 having a coupling mechanism in accordance with some embodiments. In some embodiments, system 500 include a first prosthesis component 502 and a second prosthesis component 550 that may be coupled together. For example, prosthesis component 502 may be a stem component of a multi-component stem as disclosed in U.S. Pat. No. 8,715, 362 or a monolithic stem component.

Component 502 may include a body 504 having a generally cylindrical shape extending from a first end 506 to a second end 508, it should be understood that stem component 102 may have other shapes or configurations (e.g., pyramidal, cubic, and/or oval, to list only a few possible examples). In some embodiments, the first end 506 includes a male coupling element 510, which may take the form of a threaded protrusion. For example, the male coupling element 510 may be sized and configured to engage a female coupling element (e.g., a threaded hole) of another component of a multi-component prosthesis stem. While male coupling element 510 is shown as a threaded protrusion, one of ordinary skill in the art will understand that male coupling element 510 may be implemented in other ways, such as a tapered protrusion or a protrusion including a detent, to identify only a couple of possibilities. Body 504 may include an engagement element 512. Engagement element 512 may take the form of a pair of spaced apart arcuate channels 513-1, 513-2 (collectively, "channels 513") that extend parallel to one another through body 504. Channels 513 are sized and configured to be engaged by a tool 580 when the first prosthesis component 502 is being coupled to another prosthesis component (e.g., prosthesis component 550 and/ or another stem component of a multi-component prosthesis stem) as described below.

Figure 24:
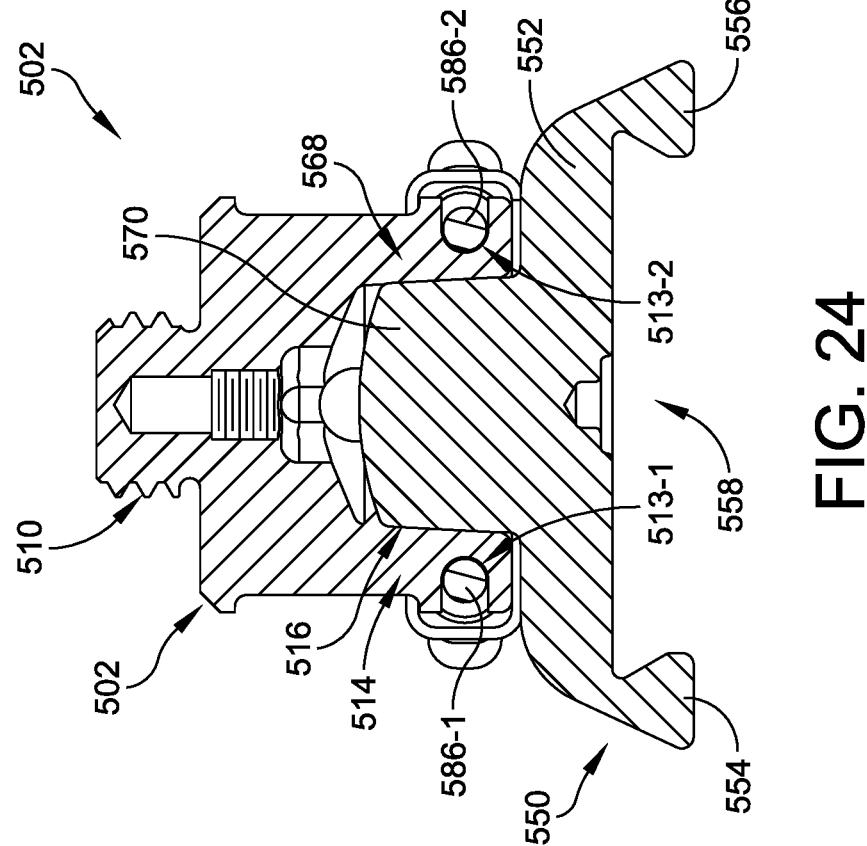
FIG. 24 is a sectional view of the system illustrated in FIG. 22 taken along line 24-24 in FIG. 23 in accordance with some embodiments.

In some embodiments, second end 508 of component 502 includes a female coupling element 514. Female coupling element 514 may take the form of a recess 516 that is sized and configured to receive a male coupling element 568. As best seen in FIG. 24, recess 516 may taper along its length, such as to form a Morse taper connection with protrusion 570 (described below) as will be understood by one of ordinary skill in the art. Body 504 may further define a hole 520 that extends laterally through body 504 (e.g., perpendicular with respect to a central longitudinal axis defined by body 504).

In some embodiments, second component 550 is a tibial tray for an ankle replacement system, such as the tibial platform 12 described in U.S. Pat. No. 8,715,362, which is incorporated by reference herein. Component 550 has a body 552 including a pair of spaced apart side rails 554, 556 that together define a channel 558. Channel 558 may be sized and configured to receive an artificial joint surface, such as the artificial joint surface described in U.S. Pat. No. 8,715,362.

Figure 22:
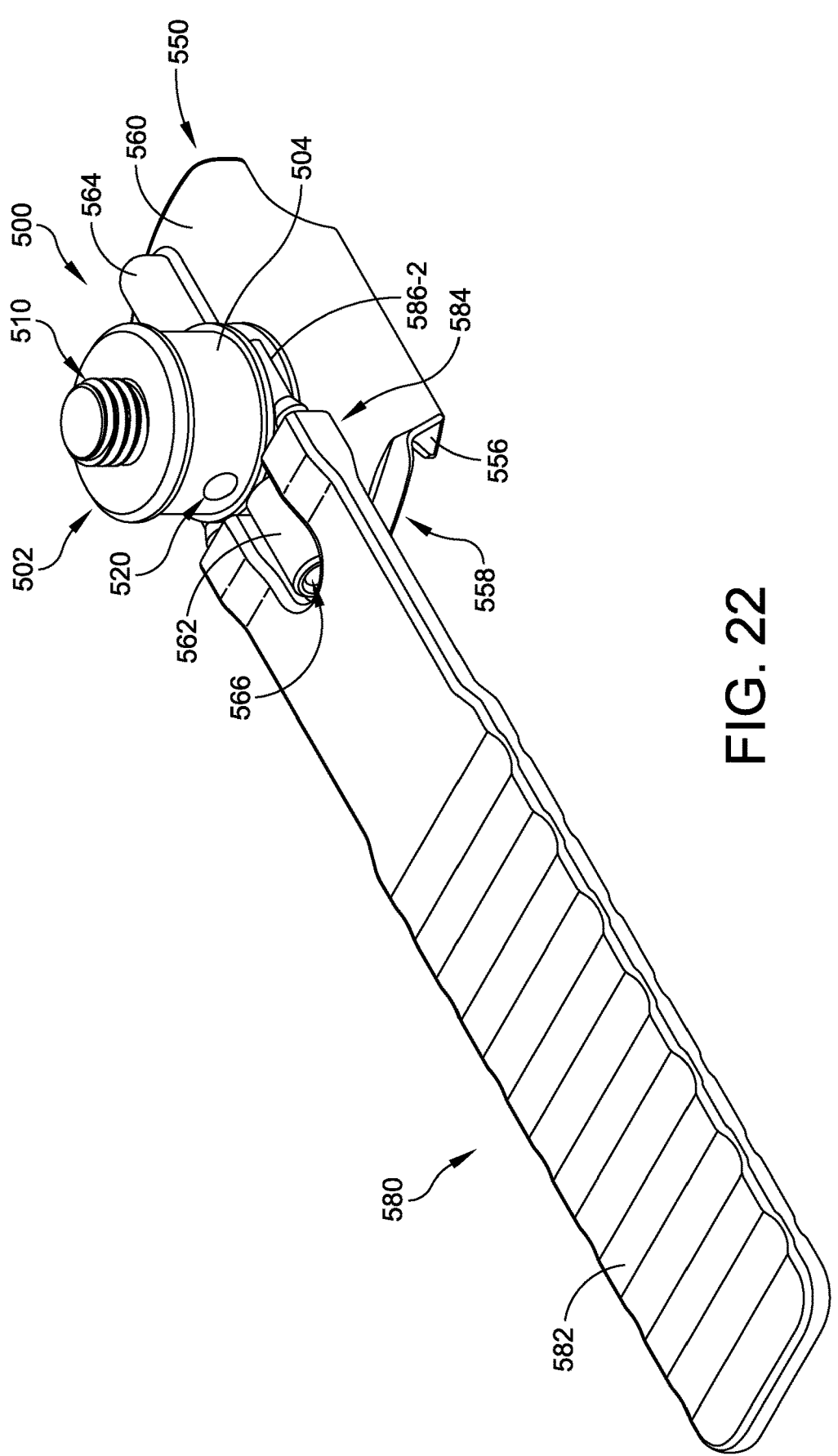
FIG. 22 is an isometric view of another example of a system having a coupling mechanism in accordance with some embodiments.
Figure 23:
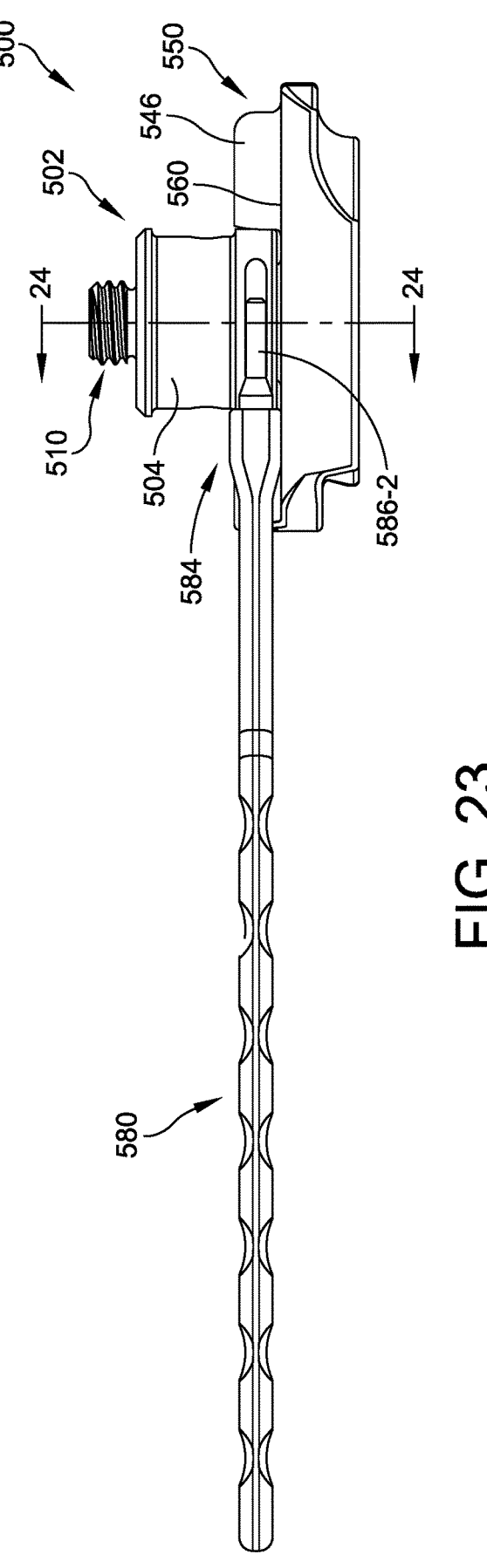
FIG. 23 is a side view of the system illustrated in FIG. 22 in accordance with some embodiments.
Figure 25:
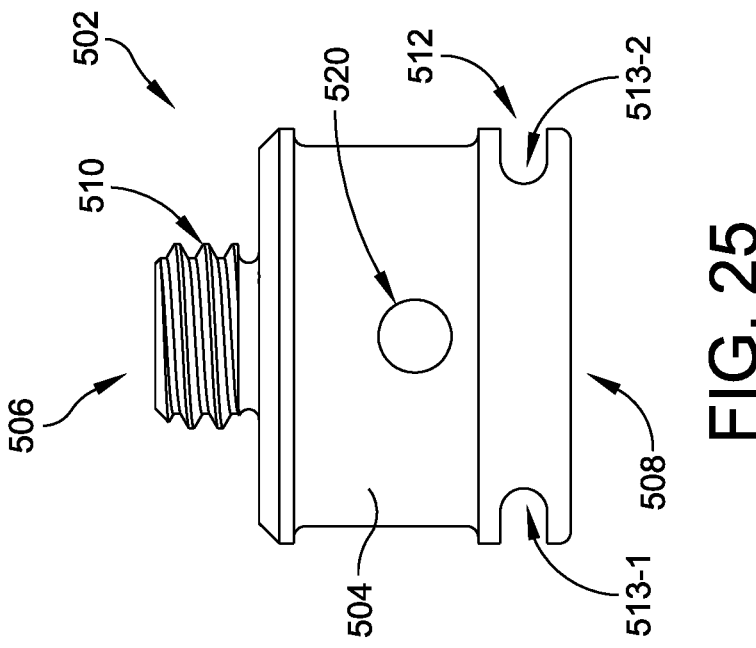
FIG. 25 is a side view of a component of the system illustrated in FIG. 22 in accordance with some embodiments.

The upper surface 560 of component 550 may include a first fin 562, which may be positioned toward the front of component 550, and a second fin 564, which may be positioned toward the rear of component 550. As best seen in FIG. 22, fin 562 defines hole 566, which may be threaded. Upper surface 560 also includes a male coupling element 568, which may take the form of a locking protrusion 570. Locking protrusion 570 is sized and configured to be received within recess 516 of female locking element 514 defined by first component 502. Although locking protrusion 570 is shown as having a generally cylindrical tapered shape, it should be understood that locking protrusion 570 may have other shapes or configurations (e.g., pyramidal, cubic, and/or oval, to list only a few possible examples). Further, it should be appreciated that additional protrusions may be provided on the upper surface 560 of component 550.

Tool 580 may include a handle 582 and an engagement portion 584 coupled to handle 582. Engagement portion 584 may have a forked shape with a pair of spaced apart prongs 586-1, 586-2 (collectively, "prongs 586") that are sized and configured to be received within channels 513 defined by component 502.

In use, the component 502 may be coupled to another stem component via the male coupling element 510. For example, and as described in the U.S. Pat. No. 8,715,362, the threaded protrusion of male coupling element 510 may be threaded into engagement with a corresponding female coupling element (e.g., a threaded hole) of the other stem component. Stem component 502 may be rotated by hand and/or by using tool 580 to engage engagement element 512 provided on the outer surface of body 504. As described above, the prongs 586 may be received within channels 513, and tool 580 may then be rotated to thread component 502 into another component as will be understood by one of ordinary skill in the art.

Component 550 may be coupled to component 502 by aligning and inserting male coupling element 568 of component 550 with and into female coupling element 514 of component 502. More particularly, protrusion 570 of male coupling element 568 is aligned with recess 516 of female coupling element 514 such that protrusion 570 may be inserted into recess 516. The respective dimensions of male coupling element 568 and female coupling element 514 provides a coupling between components 502, 550. If desired, a set or locking screw may be threaded into hole 566 to provide further securement of components 502, 550 as will be understood by one of ordinary skill in the art.

In some embodiments, a system includes a first component having a body extending from a first end to a second end. Each of the first and second ends includes a coupling element. At least one end includes a male coupling element including a detent disposed within a hole defined by a protrusion. The detent is biased by a biasing member.

In some embodiments, the detent is captured within the hole.

In some embodiments, the biasing member includes a spring.

In some embodiments, the detent includes at least one angle surface sized and configured to facilitate coupling the first component to a second component.

In some embodiments, a second component includes a body. The body includes at least one female engagement element sized and configured to engage at least one of the male coupling elements of the first component.

In some embodiments, the female engagement element includes a hole sized and configured to receive the protrusion.

In some embodiments, a shelf is disposed within the hole. The shelf is sized and configured to engage the detent of the first component.

In some embodiments, a system includes a first component having a body. The body has at least one female engagement element sized and configured to be engaged by a male coupling element of another component. The female engagement element includes a hole extending through the body and a shelf disposed within the hole.

In some embodiments, the body includes a pair of spaced apart rails that together define a channel. The hole extends from an upper surface into the channel.

In some embodiments, a second component includes a body extending from a first end to a second end. The second end of the body includes a male coupling element sized and configured to engage the female coupling element of the first component.

In some embodiments, the second component includes a second coupling element that is configured to engage a stem component of a multi-component prosthesis stem.

In some embodiments, a method includes coupling a first component to a second component. Coupling the first component to the second component includes aligning a female engagement element provided by the first component with a male coupling component provided by the second component and inserting the male coupling element into the female coupling element.

In some embodiments, a method includes coupling the second component to another component.

In some embodiments, coupling the second component to another component includes rotating the second component relative to another component.

In some embodiments, a system includes a first component having a body extending from a first end to a second end. Each of the first and second ends includes a coupling element. At least one end includes a female coupling element having a recess that inwardly extends into the body.

In some embodiments, the female coupling element includes at least one depression in communication with the recess. The at least one depression is sized and configured to receive at least one projection.

In some embodiments, the at least one depression is centrally defined within the recess.

In some embodiments, the at least one depression includes a plurality of depressions.

In some embodiments, the plurality of depressions are symmetrically arranged around a central axis defined by the recess.

In some embodiments, the plurality of depressions are arbitrarily arranged around a central axis defined by the recess.

In some embodiments, the system includes a second component having a body with an upper surface. The body of the second component includes a protrusion extending upwardly from the upper surface. The protrusion includes at least one projection extending upwardly from an upper surface of the protrusion. The protrusion is sized and configured to be received within the recess defined by the first component. The at least one projection is sized and configured to be received within the at least one depression defined by the first component.

In some embodiments, a system includes a first component having a body with an upper surface. The first component includes a male engagement element extending from the upper surface of the body. The male engagement element includes a protrusion and at least one projection extending from an upper surface of the protrusion.

In some embodiments, the at least one projection includes a plurality of projections.

In some embodiments, the body includes a pair of spaced apart rails that together define a channel.

In some embodiments, the system includes a second component having a body including a female coupling element disposed at one end. The female coupling element includes a recess and at least one depression. The recess is sized and configured to receive the protrusion, and the at least one depression is sized and configured to receive the at least one projection.

In some embodiments, the first component defines a pair of arcuate channels that extend perpendicular to a central axis defined by the recess.

In some embodiments, the pair of arcuate channels are disposed adjacent to the second end of the body.

In some embodiments, a method includes coupling a first component to a second component. Coupling the first component to the second component includes aligning a male engagement element provided by the second component with a female coupling component provided by the first component, inserting the male coupling element into the female coupling element, and compressing the first component and second component by engaging a tool in the arcuate channels.

In some embodiments, the male engagement element includes a protrusion extending from an upper surface of a body of the second component, and at least one projection extending from an upper surface of the protrusion.

In some embodiments, a method includes coupling the first component to another component.

In some embodiments, coupling the first component to another component includes rotating the first component relative to another component.

In some embodiments, a system includes a first component having a body extending from a first end to a second end. Each of the first and second ends includes a respective coupling element. At least one end having a male coupling element including a protrusion with an extension that defines a circumferential undercut.

In some embodiments, the protrusion includes a first engagement element adjacent to an end of the projection.

In some embodiments, the first engagement element includes at least one flat.

In some embodiments, the body includes a flange disposed adjacent to the protrusion and a second engagement element disposed adjacent to the flange.

In some embodiments, the system includes a second component including a body.

The body of the second component includes at least one female engagement element sized and configured to engage at least one male coupling element of the first component.

In some embodiments, the female engagement element includes a hole extending through the body of the second component.

In some embodiments, the second component defines slot for slidably receiving a locking device.

In some embodiments, the locking device includes an extension that is sized and configured to be received within the undercut for securing the second component to the first component.

In some embodiments, a system includes a first component and a locking device. The body includes an upper surface defining a slot that extends inwardly from a front end of the body. The locking device is configured to be received slideably within the slot defined by the first component.

In some embodiments, the body includes a pair of spaced apart rails that together define a channel. The body of the first component defines a hole extending from the top surface of the body to the channel.

In some embodiments, the hole defined by the body includes a portion having a reduced diameter.

In some embodiments, the system includes a second component having a second body extending from a first end to a second end. At least one end includes a male coupling element having a protrusion with an extension that defines a circumferential undercut sized and configured to receive a portion of the locking device therein.

In some embodiments, the protrusion includes an engagement element sized and configured to be received within the portion of the hole defined by the first component having the reduced diameter.

In some embodiments, a method includes aligning a male coupling element provided by a first component with a female coupling element provided by a second component, coupling the second component to the first component by engaging the male coupling element and the female coupling element, and securing the second component to the first component using a locking device.

In some embodiments, securing the second component to the first component using the locking device includes sliding the locking device along a slot defined by the second component until an extension of the locking device engages an undercut defined by the male coupling element provided by the first component.

In some embodiments, the male coupling element includes a protrusion that includes a circumferential undercut.

In some embodiments, a system includes a first component having a body. The body includes a fin that extends upwardly from an upper surface of the body. The fin includes at least one extension that extends laterally from the fin.

In some embodiments, the body includes a pair of spaced apart rails that together define a channel. The body of the first component defines a hole that extends from an upper surface of the fin to the channel such that the hole extends entirely through the body of the first component.

In some embodiments, the hole is at least partially threaded.

In some embodiments, the hole includes a countersink extending inwardly from the channel.

In some embodiments, the fin defines a second hole that extends inwardly from a front of the body.

In some embodiments, the system includes a second component having a second body extending from a first end to a second end, the second end of the second body including a female engagement element sized and configured to engage the fin and extensions of the first component.

In some embodiments, the female engagement element includes a slot that extends through the body of the second component. The slot has a complementary shape to the fin of the first component.

In some embodiments, the female engagement element includes a hole that is sized and configured to receive a fastener therein.

In some embodiments, the hole defined by the second component is threaded.

In some embodiments, a system includes a first component extending from a first end to a second end. Each of the first and second ends includes a coupling element. At least one end includes a female engagement element that includes a slot that extends through the body of the first component at an angle with respect to a longitudinal axis defined by the first component.

In some embodiments, the female engagement element includes a threaded hole inwardly extending from the second end of the first component. The hole is in communication with the slot.

In some embodiments, the system includes a second component having a second body. The second body includes an upper surface with a male engagement element that is configured to engage the female engagement element of the first component.

In some embodiments, the male engagement element of the second component includes a fin that extends along the upper surface of the second body.

In some embodiments, the fin includes a pair of laterally extending extensions.

In some embodiments, the second body includes a pair of spaced apart rails that together define a channel. The second body defines a hole that extends from the top upper surface of the second body through a channel. The hole defined by the second body is sized and configured to receive a fastener.

In some embodiments, a method includes aligning a male coupling element provided by a first component to a female coupling element provided by a second component, and coupling the second component to the first component by engaging the male coupling element and the female coupling element.

In some embodiments, a method includes securing the second component to the first component using a fastener.

In some embodiments, securing the second component to the first component using a fastener includes inserting the fastener through a hole defined by the second component and into engagement with threads of a hole defined by the first component.

Although the systems and methods have been described in terms of exemplary embodiments, they are not limited thereto. Rather, the appended claims should be construed broadly, to include other variants and embodiments of the systems and methods, which may be made by those skilled in the art without departing from the scope and range of equivalents of the invention.

What is claimed is:

1. A system, comprising:
   a first component having a body extending from a first end to a second end, each of the first and second ends including a coupling element, at least one end including a male coupling element including a protrusion having a detent disposed within a hole defined in a side of the protrusion, the detent including at least one angled surface arranged to facilitate coupling the first component to a second component, the detent being biased by a biasing member so as to be moveably coupled to the protrusion; and
   a second component having a body including at least one female engagement element defining a hole further defined by a shelf circumferentially disposed within the hole that is sized and configured to engage the detent of the male coupling element of the first component.

2. The system of claim 1, wherein the detent is retained within the hole.

3. The system of claim 1, wherein the biasing member includes a spring.

4. A system, comprising:
   a first component having a body including at least one female engagement element sized and configured to be engaged by a male coupling element of second component, wherein the female engagement element includes a hole extending through the body and a shelf circumferentially disposed within the hole that is sized and configured to engage a biased detent projecting from a portion of a male coupling element of the second component.

5. The system of claim 4, wherein the body includes a pair of spaced apart rails that together define a channel, and wherein the hole extends from an upper surface into the channel.

6. The system of claim 5, wherein the second component includes a second coupling element that is configured to engage a stem component of a multi-component prosthesis stem.

7. A method, comprising:

coupling a first component to a second component, wherein the first component includes at least one female engagement element defining a hole that is further defined by a shelf circumferentially disposed within the hole and the second component includes a protrusion having a detent disposed within a hole defined in a side of the protrusion, the detent including at least one angled surface arranged to facilitate coupling the first component to a second component, the detent being biased by a biasing member so as to be moveably coupled to the protrusion, wherein coupling the first component to the second component includes:

aligning the female engagement element provided by the first component with the male coupling component provided by the second component; and inserting the male coupling element into the female coupling element so that the angled surface of the detent slidingly engages the shelf while being biased inwardly against the biasing member so as to allow the shelf to pass the hole in the side of the protrusion to thereby couple the first component to the second component when the detent biased outwardly by the biasing member.

8. The method of claim 7, further comprising:

coupling the second component to another component.

9. The method of claim 8, wherein coupling the second component to another component includes rotating the second component relative to the another component.

10. A system comprising:

a first component including a male coupling element having a protrusion, the protrusion defining an opening in a side with a detent disposed within the opening with a biasing member disposed to bias the detent outwardly from the opening and moveably coupled to the protrusion; and a second component including a female engagement element defining a hole sized to receive the protrusion and further defining a shelf circumferentially disposed within the hole, the shelf sized to engage the detent when the protrusion is received in the hole, wherein during coupling the detent is deflectable into the opening against the biasing member as the shelf slides past the opening and, after passage, the biasing member urges the detent outward to bear against the shelf to retain the first and second components in a coupled configuration.

11. The system of claim 10, wherein the biasing member comprises a compression spring disposed within the opening and acting between the detent and the protrusion to urge the detent outwardly from the opening.

12. The system of claim 11, wherein the detent is retained within the opening by a cross-pin such that the detent remains coupled to, but is moveable relative to, the protrusion.

13. The system of claim 10, wherein the detent includes an angled face sized to slidingly engage the shelf during coupling.

14. The system of claim 10, wherein the shelf is formed by a circumferential recessed area of the second component within the hole to provide an annular shoulder positioned to engage the detent in the coupled configuration.

15. The system of claim 10, wherein the detent is moveable between a retracted position in which the detent is displaced into the opening against the biasing member and an extended position in which the detent projects outwardly from the opening to engage the shelf.

16. The system of claim 10, wherein disengagement of the first and second components is effected by depressing the detent into the opening against the biasing member and separating the first and second components.

17. The system of claim 10, wherein the opening is oriented laterally through a side of the protrusion and intersects the shelf when the first and second components are in the coupled configuration.

18. A method of coupling components, comprising:

providing a first component including a male coupling element having a protrusion that defines an opening in a side surface;

positioning a detent within the opening such that the detent is moveably coupled to the protrusion and biased outwardly by a biasing member;

providing a second component including a female engagement element defining a hole sized to receive the protrusion and further defining a shelf circumferentially disposed within the hole;

inserting the protrusion into the hole while aligning the shelf with the opening;

sliding the first and second components together so that an angled surface of the detent slidingly engages the shelf while the detent is biased inwardly into the opening against the biasing member to allow the shelf to pass the opening; and releasing the biasing member to urge the detent outward to bear against the shelf to retain the first and second components in a coupled configuration.

19. The method of claim 18, further comprising disengaging the first and second components by depressing the detent into the opening against the biasing member and separating the first and second components.

20. The method of claim 18, wherein the biasing member comprises a compression spring disposed within the opening.

21. The method of claim 18, wherein the shelf is formed by a circumferential recessed area of the second component within the hole that provides an annular shoulder for engagement by the detent.

22. The method of claim 18, wherein the detent is retained within the opening by a cross-pin that constrains motion of the detent relative to the protrusion while permitting the detent to move between retracted and extended positions.

23. The method of claim 18, wherein inserting the protrusion into the hole includes orienting the protrusion such that the opening is aligned with the shelf prior to sliding the first and second components together.

24. The method of claim 18, wherein the detent in the extended position projects outwardly from the opening to engage the shelf when the first and second components are in the coupled configuration.

25. The method of claim 18, wherein the angled surface of the detent cams along the shelf during insertion to bias the detent into the opening against the biasing member.

\* \* \* \* \*